(12) United States Patent
Shaag

(10) Patent No.: US 12,260,573 B2
(45) Date of Patent: Mar. 25, 2025

(54) ADVERSARIAL APPROACH TO USAGE OF LIDAR SUPERVISION TO IMAGE DEPTH ESTIMATION

(71) Applicant: Mobileye Vision Technologies Ltd., Jerusalem (IL)

(72) Inventor: Nadav Shaag, Jerusalem (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 556 days.

(21) Appl. No.: 17/698,344

(22) Filed: Mar. 18, 2022

(65) Prior Publication Data

US 2022/0309693 A1    Sep. 29, 2022

Related U.S. Application Data

(60) Provisional application No. 63/164,700, filed on Mar. 23, 2021.

(51) Int. Cl.
*G06T 7/521* (2017.01)
*G01B 11/22* (2006.01)
(Continued)

(52) U.S. Cl.
CPC .............. *G06T 7/521* (2017.01); *G01B 11/22* (2013.01); *G01S 17/89* (2013.01); *G01S 17/931* (2020.01);
(Continued)

(58) Field of Classification Search
CPC ......... G01B 11/22; G01S 17/86; G01S 17/89; G01S 17/931; G06N 3/045; G06N 3/0475; G06N 3/08; G06N 3/084; G06N 3/094; G06T 2207/10028; G06T 2207/20076; G06T 2207/20081; G06T 2207/20084; G06T 2207/20221; G06T 2207/30252; G06T 2207/30261; G06T 7/521; G06T 7/55

See application file for complete search history.

(56) References Cited

U.S. PATENT DOCUMENTS

2019/0051056 A1* 2/2019 Chiu ................... G06F 16/903
2020/0341466 A1* 10/2020 Pham .................. G08G 1/166
(Continued)

OTHER PUBLICATIONS

A Garcia-Garcia et al.,"A Review on Deep Learning Techniques Applied to Semantic Segmentation," Apr. 22, 2017,Computer Vision and Pattern Recognition,pp. 1-15.*
(Continued)

*Primary Examiner* — Omar S Ismail
(74) *Attorney, Agent, or Firm* — Banner & Witcoff Ltd.

(57) ABSTRACT

Techniques are disclosed for improving upon the usage of Light Detection and Ranging (LIDAR) supervision to perform image depth estimation. The techniques use a generator and adversary network to generate respective models that "compete" against one another to enable the generator model to output a desired output image that compensates for a LIDAR image having a structured or lined data pattern. The techniques described herein may be suitable for use by vehicles and/or other agents operating in a particular environment as part of machine vision algorithms that are implemented to perform autonomous and/or semi-autonomous functions.

26 Claims, 9 Drawing Sheets

(51) Int. Cl.
G01S 17/89 (2020.01)
G01S 17/931 (2020.01)
G06N 3/08 (2023.01)

(52) U.S. Cl.
CPC ...... *G06N 3/08* (2013.01); *G06T 2207/10028* (2013.01); *G06T 2207/20076* (2013.01); *G06T 2207/20081* (2013.01); *G06T 2207/20084* (2013.01); *G06T 2207/30252* (2013.01)

(56) References Cited

U.S. PATENT DOCUMENTS

| | | | |
|---|---|---|---|
| 2020/0410254 A1* | 12/2020 | Pham | G06V 10/454 |
| 2021/0004976 A1* | 1/2021 | Guizilini | G06T 7/521 |
| 2021/0158041 A1* | 5/2021 | Chowdhary | G06V 20/188 |
| 2021/0213616 A1* | 7/2021 | Ross | G06V 20/10 |
| 2021/0286068 A1* | 9/2021 | Kumar | G01S 13/87 |
| 2021/0352262 A1* | 11/2021 | Buslaev | G06T 7/80 |

OTHER PUBLICATIONS

Fatemeh Alidoost et al.,"2D Image-To-3D Model: Knowledge-Based 3D Building Reconstruction (3DBR) Using Single Aerial Images and Convolutional Neural Networks (CNNs)," Sep. 23, 2019,remote sensing 2019, 11, 2219; doi: 10.3390/rs11192219,pp. 1-20.*

Kin Gwn Lore et al.,"Generative adversarial networks for depth map estimation from RGB video," Dec. 16, 2018, 2018 IEEE/CVF Conference on Computer Vision and Pattern Recognition Workshops, pp. 1258-1265.*

Rongrong Ji et al.,"Semi-Supervised Adversarial Monocular Depth Estimation," Sep. 2, 2020,IEEE Transactions on Pattern Analysis and Machine Intelligence, vol. 42, No. 10, Oct. 2020,pp. 2410-2420.*

Shunkai Li et al.,"Sequential Adversarial Learning for Self-Supervised Deep Visual Odometry," Oct. 2019,Proceedings of the IEEE/CVF International Conference on Computer Vision (ICCV), 2019, pp. 2851-2857.*

David Griffiths et al.,"Improving public data for building segmentation from Convolutional Neural Networks (CNNs) for fused airborne lidar and image data using active," Jun. 6, 2019, ISPRS Journal of Photogrammetry and Remote Sensing 154 (2019),pp. 70-75.*

Pengbin Zhang et al.,"Urban Land Use and Land Cover Classification Using Novel Deep Learning Models Based on High Spatial Resolution Satellite Imagery," Nov. 1, 2018, Sensors 2018, 18, 3717,pp. 1-10.*

* cited by examiner

ADVERSARIAL APPROACH TO USAGE OF LIDAR SUPERVISION TO IMAGE DEPTH ESTIMATION

CROSS-REFERENCE TO RELATED APPLICATIONS

This application claims priority to provisional application No. 63/164,700, filed on Mar. 23, 2021, the contents of which are incorporated herein by reference in their entirety.

TECHNICAL FIELD

This disclosure generally relates to image depth estimation and, more particularly, to the implementation of a training process that provides a competing use of a generator model and an adversary model to enable the generation of a desired output image that compensates for Light Detection and Ranging (LIDAR) sensor images having a structured or lined data pattern.

BACKGROUND

A common approach to supervise a model that aims to predict depth per pixel for a target image during training is to record data with LIDAR sensor data, which is synced and calibrated with the video stream from a camera. Then, using knowledge of the intrinsic and extrinsic calibration of both the camera and the LIDAR, the 3D points of the LIDAR that were scanned close to a captured image can be approximately projected onto the image space to produce sparse depth image data. However, such conventional approaches have various drawbacks.

BRIEF DESCRIPTION OF THE DRAWINGS/FIGURES

The accompanying drawings, which are incorporated herein and form a part of the specification, illustrate the aspects of the present disclosure and, together with the description, and further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Autonomous Vehicle Architecture and Operation

Figure 1:
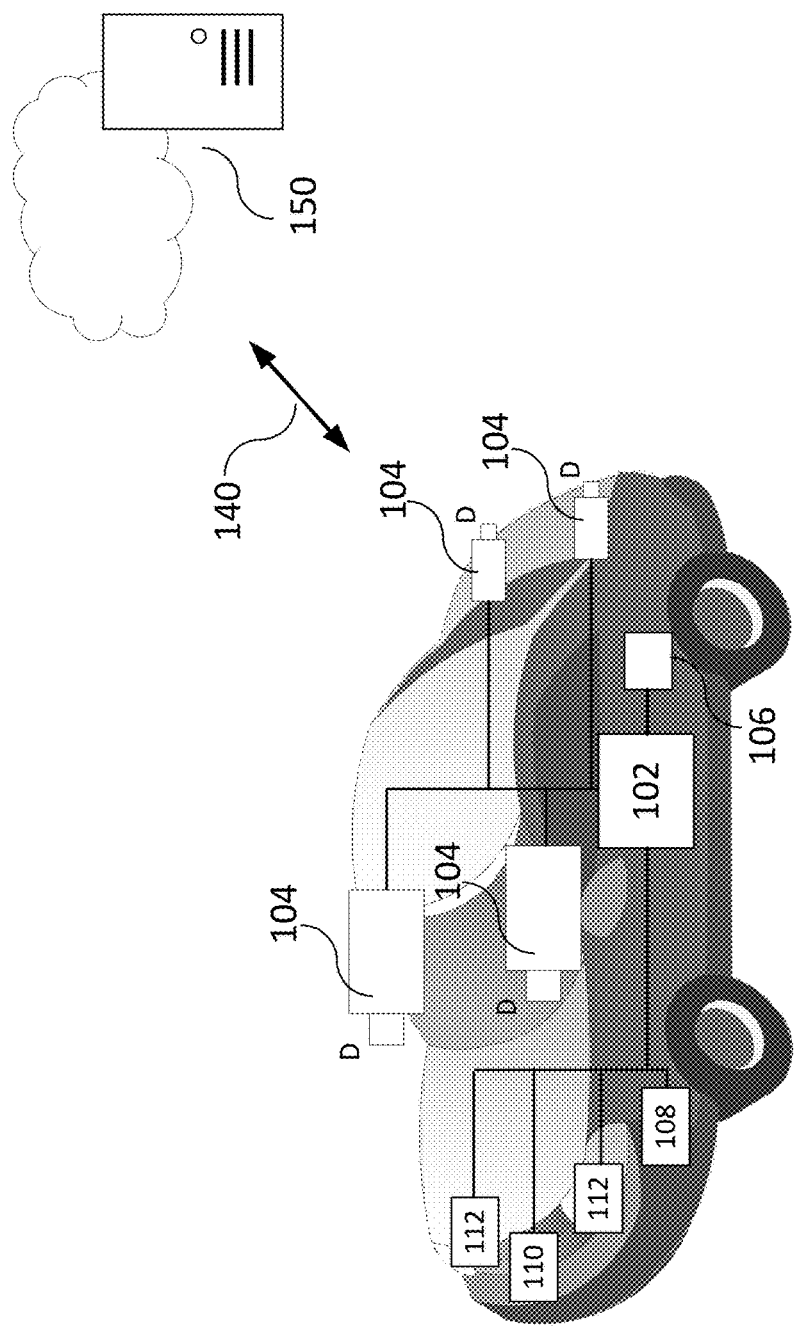
FIG. 1 illustrates an example vehicle in accordance with one or more aspects of the present disclosure.

FIG. 1 shows a vehicle 100 including a safety system 200 (see also FIG. 2) in accordance with various aspects of the present disclosure. The vehicle 100 and the safety system 200 are exemplary in nature, and may thus be simplified for explanatory purposes. Locations of elements and relational distances (as discussed herein, the Figures are not to scale) are provided by way of example and not limitation. The safety system 200 may include various components depending on the requirements of a particular implementation and/or application, and may facilitate the navigation and/or control of the vehicle 100. The vehicle 100 may be an autonomous vehicle (AV), which may include any level of automation (e.g. levels 0-5), which includes no automation or full automation (level 5). The vehicle 100 may implement the safety system 200 as part of any suitable type of autonomous or driving assistance control system, including AV and/or advanced driver-assistance system (ADAS), for instance. The safety system 200 may include one or more components that are integrated as part of the vehicle 100 during manufacture, part of an add-on or aftermarket device, or combinations of these. Thus, the various components of the safety system 200 as shown in FIG. 2 may be integrated as part of the vehicle's systems and/or part of an aftermarket system that is installed in the vehicle 100.

The one or more processors 102 may be integrated with or separate from an engine control unit (ECU) of the vehicle 100. The safety system 200 may generate data to control or assist to control the ECU and/or other components of the vehicle 100 to directly or indirectly control the driving of the vehicle 100. However, the aspects described herein are not limited to implementation within autonomous or semi-autonomous vehicles, as these are provided by way of example. The aspects described herein may be implemented as part of any suitable type of vehicle that may be capable of travelling with or without any suitable level of human assistance in a particular driving environment. Therefore, one or more of the various vehicle components such as those discussed herein with reference to FIG. 2 for instance, may be implemented as part of a standard vehicle (i.e. a vehicle not using autonomous driving functions), a fully autonomous vehicle, and/or a semi-autonomous vehicle, in various aspects. In aspects implemented as part of a standard vehicle, it is understood that the safety system 200 may perform alternate functions, and thus in accordance with such aspects the safety system 200 may alternatively represent any suitable type of system that may be implemented by a standard vehicle without necessarily utilizing autonomous or semi-autonomous control related functions.

Figure 2:
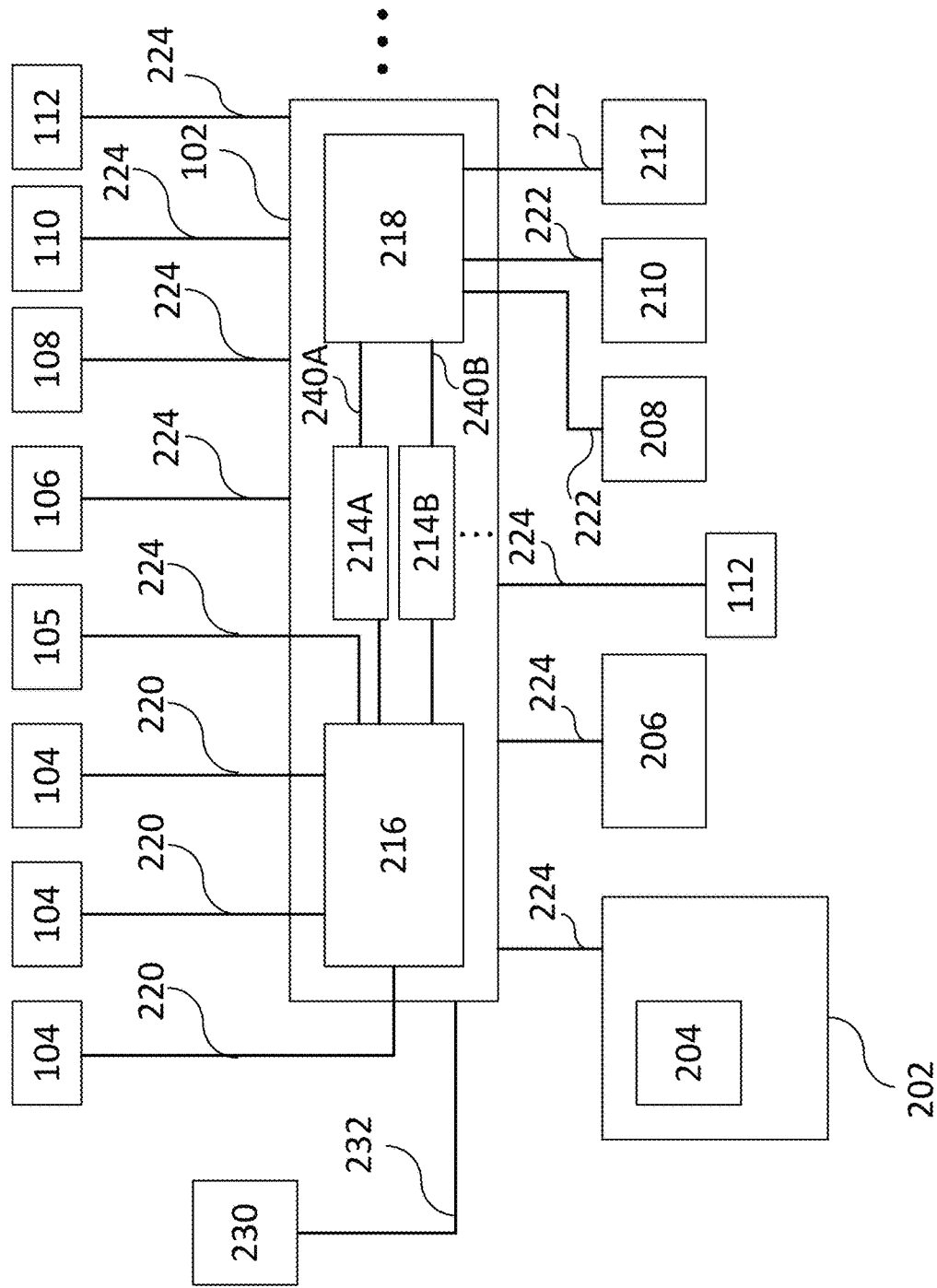
FIG. 2 illustrates various example electronic components of a safety system of a vehicle, in accordance with one or more aspects of the present disclosure.

Regardless of the particular implementation of the vehicle 100 and the accompanying safety system 200 as shown in FIG. 1 and FIG. 2, the safety system 200 may include one or more processors 102, one or more image acquisition devices 104 such as, e.g., one or more cameras or any other suitable sensor configured to perform image acquisition over any suitable range of wavelengths, one or more position sensors 106, which may be implemented as a position and/or location-identifying system such as a Global Navigation Satellite System (GNSS), e.g., a Global Positioning System (GPS), one or more memories 202, one or more map databases 204, one or more user interfaces 206 (such as, e.g., a display, a touch screen, a microphone, a loudspeaker, one or more buttons and/or switches, and the like), and one or more wireless transceivers 208, 210, 212.

The wireless transceivers 208, 210, 212 may be configured to operate in accordance with any suitable number and/or type of desired radio communication protocols or standards. By way of example, a wireless transceiver (e.g., a first wireless transceiver 208) may be configured in accordance with a Short-Range mobile radio communication standard such as e.g. Bluetooth, Zigbee, and the like. As another example, a wireless transceiver (e.g., a second wireless transceiver 210) may be configured in accordance with a Medium or Wide Range mobile radio communication standard such as e.g. a 3G (e.g. Universal Mobile Telecommunications System—UMTS), a 4G (e.g. Long Term Evolution—LTE), or a 5G mobile radio communication standard in accordance with corresponding 3GPP (3rd Generation Partnership Project) standards, the most recent version at the time of this writing being the 3GPP Release 16 (2020).

As a further example, a wireless transceiver (e.g., a third wireless transceiver 212) may be configured in accordance with a Wireless Local Area Network communication protocol or standard such as e.g. in accordance with IEEE 802.11 Working Group Standards, the most recent version at the time of this writing being IEEE Std 802.11™-2020, published Feb. 26, 2021 (e.g. 802.11, 802.11a, 802.11b, 802.11g, 802.11n, 802.11p, 802.11-12, 802.11ac, 802.11ad, 802.11ah, 802.11ax, 802.11ay, and the like). The one or more wireless transceivers 208, 210, 212 may be configured to transmit signals via an antenna system (not shown) using an air interface. As additional examples, one or more of the transceivers 208, 210, 212 may be configured to implement one or more vehicle to everything (V2X) communication protocols, which may include vehicle to vehicle (V2V), vehicle to infrastructure (V2I), vehicle to network (V2N), vehicle to pedestrian (V2P), vehicle to device (V2D), vehicle to grid (V2G), and any other suitable communication protocols.

One or more of the wireless transceivers 208, 210, 212 may additionally or alternatively be configured to enable communications between the vehicle 100 and one or more other remote computing devices via one or more wireless links 140. This may include, for instance, communications with a remote server or other suitable computing system 150 as shown in FIG. 1. The example shown FIG. 1 illustrates such a remote computing system 150 as a cloud computing system, although this is by way of example and not limitation, and the computing system 150 may be implemented in accordance with any suitable architecture and/or network and may constitute one or several physical computers, servers, processors, etc. that comprise such a system. As another example, the computing system 150 may be implemented as an edge computing system and/or network.

The one or more processors 102 may implement any suitable type of processing circuitry, other suitable circuitry, memory, etc., and utilize any suitable type of architecture. The one or more processors 102 may be configured as a controller implemented by the vehicle 100 to perform various vehicle control functions, navigational functions, etc. For example, the one or more processors 102 may be configured to function as a controller for the vehicle 100 to analyze sensor data and received communications, to calculate specific actions for the vehicle 100 to execute for navigation and/or control of the vehicle 100, and to cause the corresponding action to be executed, which may be in accordance with an AV or ADAS system, for instance. The one or more processors and/or the safety system 200 may form the entirety of or portion of an advanced driver-assistance system (ADAS).

Moreover, one or more of the processors 214A, 214B, 216, and/or 218 of the one or more processors 102 may be configured to work in cooperation with one another and/or with other components of the vehicle 100 to collect information about the environment (e.g., sensor data, such as images, depth information (for a Lidar for example), etc.). In this context, one or more of the processors 214A, 214B, 216, and/or 218 of the one or more processors 102 may be referred to as "processors." The processors can thus be implemented (independently or together) to create mapping information from the harvested data, e.g., Road Segment Data (RSD) information that may be used for Road Experience Management (REM) mapping technology, the details of which are further described below. As another example, the processors can be implemented to process mapping information (e.g. roadbook information used for REM mapping technology) received from remote servers over a wireless communication link (e.g. link 140) to localize the vehicle 100 on an AV map, which can be used by the processors to control the vehicle 100.

The one or more processors 102 may include one or more application processors 214A, 214B, an image processor 216, a communication processor 218, and may additionally or alternatively include any other suitable processing device, circuitry, components, etc. not shown in the Figures for purposes of brevity. Similarly, image acquisition devices 104 may include any suitable number of image acquisition devices and components depending on the requirements of a particular application. Image acquisition devices 104 may include one or more image capture devices (e.g., cameras, charge coupling devices (CCDs), or any other type of image sensor). The safety system 200 may also include a data interface communicatively connecting the one or more processors 102 to the one or more image acquisition devices 104. For example, a first data interface may include any wired and/or wireless first link 220, or first links 220 for transmitting image data acquired by the one or more image acquisition devices 104 to the one or more processors 102, e.g., to the image processor 216.

The wireless transceivers 208, 210, 212 may be coupled to the one or more processors 102, e.g., to the communication processor 218, e.g., via a second data interface. The second data interface may include any wired and/or wireless second link 222 or second links 222 for transmitting radio transmitted data acquired by wireless transceivers 208, 210, 212 to the one or more processors 102, e.g., to the communication processor 218. Such transmissions may also include communications (one-way or two-way) between the vehicle 100 and one or more other (target) vehicles in an environment of the vehicle 100 (e.g., to facilitate coordination of navigation of the vehicle 100 in view of or together with other (target) vehicles in the environment of the vehicle 100), or even a broadcast transmission to unspecified recipients in a vicinity of the transmitting vehicle 100.

The memories 202, as well as the one or more user interfaces 206, may be coupled to each of the one or more processors 102, e.g., via a third data interface. The third data interface may include any wired and/or wireless third link 224 or third links 224. Furthermore, the position sensors 106 may be coupled to each of the one or more processors 102, e.g., via the third data interface.

Each processor 214A, 214B, 216, 218 of the one or more processors 102 may be implemented as any suitable number and/or type of hardware-based processing devices (e.g. processing circuitry), and may collectively, i.e. with the one or more processors 102 form one or more types of controllers as discussed herein. The architecture shown in FIG. 2 is provided for ease of explanation and as an example, and the vehicle 100 may include any suitable number of the one or more processors 102, each of which may be similarly configured to utilize data received via the various interfaces and to perform one or more specific tasks.

For example, the one or more processors 102 may form a controller that is configured to perform various control-related functions of the vehicle 100 such as the calculation and execution of a specific vehicle following speed, velocity, acceleration, braking, steering, trajectory, etc. As another example, the vehicle 100 may, in addition to or as an alternative to the one or more processors 102, implement other processors (not shown) that may form a different type of controller that is configured to perform additional or alternative types of control-related functions. Each controller may be responsible for controlling specific subsystems and/or controls associated with the vehicle 100. In accordance with such aspects, each controller may receive data from respectively coupled components as shown in FIG. 2 via respective interfaces (e.g. 220, 222, 224, 232, etc.), with the wireless transceivers 208, 210, and/or 212 providing data to the respective controller via the second links 222, which function as communication interfaces between the respective wireless transceivers 208, 210, and/or 212 and each respective controller in this example.

To provide another example, the application processors 214A, 214B may individually represent respective controllers that work in conjunction with the one or more processors 102 to perform specific control-related tasks. For instance, the application processor 214A may be implemented as a first controller, whereas the application processor 214B may be implemented as a second and different type of controller that is configured to perform other types of tasks as discussed further herein. In accordance with such aspects, the one or more processors 102 may receive data from respectively coupled components as shown in FIG. 2 via the various interfaces 220, 222, 224, 232, etc., and the communication processor 218 may provide communication data received from other vehicles (or to be transmitted to other vehicles) to each controller via the respectively coupled links 240A, 240B, which function as communication interfaces between the respective application processors 214A, 214B and the communication processors 218 in this example.

The one or more processors 102 may additionally be implemented to communicate with any other suitable components of the vehicle 100 to determine a state of the vehicle while driving or at any other suitable time. For instance, the vehicle 100 may include one or more vehicle computers, sensors, ECUs, interfaces, etc., which may collectively be referred to as vehicle components 230 as shown in FIG. 2.

The one or more processors 102 are configured to communicate with the vehicle components 230 via an additional data interface 232, which may represent any suitable type of links and may operate in accordance with any suitable communication protocol (e.g. CAN bus communications). Using the data received via the data interface 232, the one or more processors 102 may determine any suitable type of vehicle status information such as the current drive gear, current engine speed, acceleration capabilities of the vehicle 100, etc. As another example, various metrics used to control the speed, acceleration, braking, steering, etc. may be received via the vehicle components 230, which may include receiving any suitable type of signals that are indicative of such metrics or varying degrees of how such metrics vary over time (e.g. brake force, wheel angle, reverse gear, etc.).

The one or more processors 102 may include any suitable number of other processors 214A, 214B, 216, 218, each of which may comprise processing circuitry such as sub-processors, a microprocessor, pre-processors (such as an image pre-processor), graphics processors, a central processing unit (CPU), support circuits, digital signal processors, integrated circuits, memory, or any other types of devices suitable for running applications and for data processing (e.g. image processing, audio processing, etc.) and analysis and/or to enable vehicle control to be functionally realized. In some aspects, each processor 214A, 214B, 216, 218 may include any suitable type of single or multi-core processor, microcontroller, central processing unit, etc. These processor types may each include multiple processing units with local memory and instruction sets. Such processors may include video inputs for receiving image data from multiple image sensors, and may also include video out capabilities.

Any of the processors 214A, 214B, 216, 218 disclosed herein may be configured to perform certain functions in accordance with program instructions, which may be stored in the local memory of each respective processor 214A, 214B, 216, 218, or accessed via another memory that is part of the safety system 200 or external to the safety system 200. This memory may include the one or more memories 202. Regardless of the particular type and location of memory, the memory may store software and/or executable (i.e. computer-readable) instructions that, when executed by a relevant processor (e.g., by the one or more processors 102, one or more of the processors 214A, 214B, 216, 218, etc.), controls the operation of the safety system 200 and may perform other functions such those identified with the aspects described in further detail below. As one example, the one or more processors 102, which may include one or more of the processors 214A, 214B, 216, 218, etc., may execute the computer-readable instructions to perform one or more active depth sensing pattern completion tasks (e.g. for completion of a Light Detection and Ranging (LIDAR) pattern) as further discussed herein. This may be achieved, for instance, by applying a trained generator model that is deployed for this use in the vehicle 100 to received sensor data to predict dense depth image data. The manner in which the generator model is trained for such purposes is discussed in further detail below.

A relevant memory accessed by the one or more processors 214A, 214B, 216, 218 (e.g. the one or more memories 202) may also store one or more databases and image processing software, as well as a trained system, such as a neural network, or a deep neural network, for example, that may be utilized to perform the tasks in accordance with any of the aspects as discussed herein. A relevant memory accessed by the one or more processors 214A, 214B, 216,

218 (e.g. the one or more memories 202) may be implemented as any suitable number and/or type of non-transitory computer-readable medium such as random-access memories, read only memories, flash memories, disk drives, optical storage, tape storage, removable storage, or any other suitable types of storage.

The components associated with the safety system 200 as shown in FIG. 2 are illustrated for ease of explanation and by way of example and not limitation. The safety system 200 may include additional, fewer, or alternate components as shown and discussed herein with reference to FIG. 2. Moreover, one or more components of the safety system 200 may be integrated or otherwise combined into common processing circuitry components or separated from those shown in FIG. 2 to form distinct and separate components. For instance, one or more of the components of the safety system 200 may be integrated with one another on a common die or chip. As an illustrative example, the one or more processors 102 and the relevant memory accessed by the one or more processors 214A, 214B, 216, 218 (e.g. the one or more memories 202) may be integrated on a common chip, die, package, etc., and together comprise a controller or system configured to perform one or more specific tasks or functions.

In some aspects, the safety system 200 may further include components such as a speed sensor 108 (e.g. a speedometer) for measuring a speed of the vehicle 100. The safety system 200 may also include one or more sensors 105, which may include one or more accelerometers (either single axis or multiaxis) for measuring accelerations of the vehicle 100 along one or more axes, and additionally or alternatively one or more gyro sensors. The one or more sensors 105 may further include additional sensors or different sensor types such as an ultrasonic sensor, infrared sensors, a thermal sensor, digital compasses, and the like. The safety system 200 may also include one or more radar sensors 110 and one or more LIDAR sensors 112 (which may be integrated in the head lamps of the vehicle 100). The radar sensors 110 and/or the LIDAR sensors 112 may be configured to provide pre-processed sensor data, such as radar target lists or LIDAR target lists. The third data interface (e.g., one or more links 224) may couple the one or more sensors 105, the speed sensor 108, the one or more radar sensors 110, and the one or more LIDAR sensors 112 to at least one of the one or more processors 102.

Data referred to as REM map data (or alternatively as roadbook map data), may also be stored in a relevant memory accessed by the one or more processors 214A, 214B, 216, 218 (e.g. the one or more memories 202) or in any suitable location and/or format, such as in a local or cloud-based database, accessed via communications between the vehicle and one or more external components (e.g. via the transceivers 208, 210, 212), etc. Regardless of where the REM map data is stored and/or accessed, the REM map data may include a geographic location of known landmarks that are readily identifiable in the navigated environment in which the vehicle 100 travels. The location of the landmarks may be generated from a historical accumulation from other vehicles driving on the same road that collect data regarding the appearance and/or location of landmarks (e.g. "crowd sourcing"). Thus, each landmark may be correlated to a set of predetermined geographic coordinates that has already been established. Therefore, in addition to the use of location-based sensors such as GNSS, the database of landmarks provided by the REM map data enables the vehicle 100 to identify the landmarks using the one or more image acquisition devices 104. Once identified, the vehicle 100 may implement other sensors such as LIDAR, accelerometers, speedometers, etc. or images from the image acquisitions device 104, to evaluate the position and location of the vehicle 100 with respect to the identified landmark positions.

Furthermore, the vehicle 100 may determine its own motion, which is referred to as "ego-motion." Ego-motion is generally used for computer vision algorithms and other similar algorithms to represent the motion of a vehicle camera across a plurality of frames, which provides a baseline (i.e. a spatial relationship) that can be used to compute the 3D structure of a scene from respective images. The vehicle 100 may analyze the ego-motion to determine the position and orientation of the vehicle 100 with respect to the identified known landmarks. Because the landmarks are identified with predetermined geographic coordinates, the vehicle 100 may determine its position on a map based upon a determination of its position with respect to identified landmarks using the landmark-correlated geographic coordinates. Doing so provides distinct advantages that combine the benefits of smaller scale position tracking with the reliability of GNSS positioning systems while avoiding the disadvantages of both systems. It is further noted that the analysis of ego motion in this manner is one example of an algorithm that may be implemented with monocular imaging to determine a relationship between a vehicle's location and the known location of known landmark(s), thus assisting the vehicle to localize itself. However, ego-motion is not necessary or relevant for other types of technologies, and therefore is not essential for localizing using monocular imaging. Thus, in accordance with the aspects as described herein, the vehicle 100 may leverage any suitable type of localization technology.

Thus, the REM map data is generally constructed as part of a series of steps, which may involve any suitable number of vehicles that opt into the data collection process. For instance, Road Segment Data (RSD) is collected as part of a harvesting step. As each vehicle collects data, the data is then transmitted to the cloud or to another suitable external location as data points. A suitable computing device (e.g. a cloud server) then analyzes the data points from individual drives on the same road, and aggregates and aligns these data points with one another. After alignment has been performed, the data points are used to define a precise outline of the road infrastructure. Next, relevant semantics are identified that enable vehicles to understand the immediate driving environment, i.e. features and objects are defined that are linked to the classified data points. The features and objects defined in this manner may include, for instance, traffic lights, road arrows, signs, road edges, drivable paths, lane split points, stop lines, lane markings, etc. to the driving environment so that a vehicle may readily identify these features and objects using the REM map data. This information is then compiled into a roadbook map, which constitutes a bank of driving paths, semantic road information such as features and objects, and aggregated driving behavior.

The map database may include any suitable type of database configured to store (digital) map data for the vehicle 100, e.g., for the safety system 200. The one or more processors 102 may download information to the map database 204 over a wired or wireless data connection (e.g. the link(s) 140) using a suitable communication network (e.g., over a cellular network and/or the Internet, etc.). Again, the map database 204 may store the REM map data, which includes data relating to the position, in a reference coordinate system, of various landmarks such as items, including roads, water features, geographic features, businesses, points of interest, restaurants, gas stations, etc.

The map database 204 may thus store, as part of the REM map data, not only the locations of such landmarks, but also descriptors relating to those landmarks, including, for example, names associated with any of the stored features, and may also store information relating to details of the items such as a precise position and orientation of items. In some cases, the REM map data may store a sparse data model including polynomial representations of certain road features (e.g., lane markings) or target trajectories for the vehicle 100. The REM map data may also include stored representations of various recognized landmarks that may be provided to determine or update a known position of the vehicle 100 with respect to a target trajectory. The landmark representations may include data fields such as landmark type, landmark location, etc., among other potential identifiers. The REM map data may also include non-semantic features including point clouds of certain objects or features in the environment, and feature point and descriptors.

The map database 204 may be augmented with data in addition to the REM map data, and/or the map database 204 and/or the REM map data may reside partially or entirely as part of the remote computing system 150. As discussed herein, the location of known landmarks and map database information, which may be stored in the map database 204 and/or the remote computing system 150, may form what is referred to herein as "REM map data" or "roadbook map data." Thus, the one or more processors 102 may process sensory information (such as images, radar signals, depth information from LIDAR or stereo processing of two or more images) of the environment of the vehicle 100 together with position information, such as GPS coordinates, a vehicle's ego-motion, etc., to determine a current location and/or orientation of the vehicle 100 relative to the known landmarks by using information contained in the roadbook map. The determination of the vehicle's location may thus be refined in this manner. Certain aspects of this technology may additionally or alternatively be included in a localization technology such as a mapping and routing model.

Safety Driving Model

Furthermore, the safety system 200 may implement a safety driving model or SDM (also referred to as a "driving policy model," "driving policy," or simply as a "driving model"), e.g., which may be utilized and/or executed as part of the ADAS system as discussed herein. By way of example, the safety system 200 may include (e.g. as part of the driving policy) a computer implementation of a formal model such as a safety driving model. A safety driving model may include an implementation of a mathematical model formalizing an interpretation of applicable laws, standards, policies, etc. that are applicable to self-driving (e.g., ground) vehicles. In some embodiments, the SDM may comprise a standardized driving policy such as the Responsibility Sensitivity Safety (RSS) model. However, the embodiments are not limited to this particular example, and the SDM may be implemented using any suitable driving policy model that defines various safety parameters that the AV should comply with to facilitate safe driving.

For instance, the SDM may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic, and in turn limit the scalability of system deployment; and third, the interpretation should be efficiently verifiable in the sense that it can be rigorously proven that the self-driving (autonomous) vehicle correctly implements the interpretation of the law. An implementation in a host vehicle of a safety driving model (e.g. the vehicle 100) may be or include an implementation of a mathematical model for safety assurance that enables identification and performance of proper responses to dangerous situations such that self-perpetrated accidents can be avoided.

A safety driving model may implement logic to apply driving behavior rules such as the following five rules:
Do not hit someone from behind.
Do not cut-in recklessly.
Right-of-way is given, not taken.
Be careful of areas with limited visibility.
If you can avoid an accident without causing another one, you must do it.

It is to be noted that these rules are not limiting and not exclusive, and can be amended in various aspects as desired. The rules thus represent a social driving "contract" that might be different depending upon the region, and may also develop over time. While these five rules are currently applicable in most countries, the rules may not be complete or the same in each region or country and may be amended.

As described above, the vehicle 100 may include the safety system 200 as also described with reference to FIG. 2. Thus, the safety system 200 may generate data to control or assist to control the ECU of the vehicle 100 and/or other components of the vehicle 100 to directly or indirectly navigate and/or control the driving operation of the vehicle 100, such navigation including driving the vehicle 100 or other suitable operations as further discussed herein. This navigation may optionally include adjusting one or more SDM parameters, which may occur in response to the detection of any suitable type of feedback that is obtained via image processing, sensor measurements, etc. The feedback used for this purpose may be collectively referred to herein as "environmental data measurements" and include any suitable type of data that identifies a state associated with the external environment, the vehicle occupants, the vehicle 100, and/or the cabin environment of the vehicle 100, etc.

For instance, the environmental data measurements may be used to identify a longitudinal and/or lateral distance between the vehicle 100 and other vehicles, the presence of objects in the road, the location of hazards, etc. The environmental data measurements may be obtained and/or be the result of an analysis of data acquired via any suitable components of the vehicle 100, such as the one or more image acquisition devices 104, the one or more sensors 105, the position sensors 106, the speed sensor 108, the one or more radar sensors 110, the one or more LIDAR sensors 112, etc. To provide an illustrative example, the environmental data may be used to generate an environmental model based upon any suitable combination of the environmental data measurements. The environmental model may further be generated (at least partially) using a dense depth image data, which may be acquired via the application of a trained generator model to received sensor inputs. The dense depth image data may be generated as a result of performing one or more active depth sensing pattern completion tasks using the trained generator model, as discussed in further detail herein. Thus, the vehicle 100 may utilize the dense depth image data to perform various navigation-related operations within the framework of the driving policy model.

The navigation-related operation may be performed, for instance, by generating the environmental model and using the driving policy model in conjunction with the environmental model to determine an action to be carried out by the vehicle. That is, the driving policy model may be applied based upon the environmental model to determine one or more actions (e.g. navigation-related operations) to be carried out by the vehicle. The SDM can be used in conjunction (as part of or as an added layer) with the driving policy model to assure a safety of an action to be carried out by the vehicle at any given instant. For example, the ADAS may leverage or reference the SDM parameters defined by the safety driving model to determine navigation-related operations of the vehicle 100 in accordance with the environmental data measurements depending upon the particular scenario. The navigation-related operations may thus cause the vehicle 100 to execute a specific action based upon the environmental model to comply with the SDM parameters defined by the SDM model as discussed herein. For instance, navigation-related operations may include steering the vehicle 100, changing an acceleration and/or velocity of the vehicle 100, executing predetermined trajectory maneuvers, etc. In other words, the environmental model may be generated at least in part on the dense depth image data, and the applicable driving policy model may then be applied together with the environmental model to determine a navigation-related operation to be performed by the vehicle.

Model Training for Dense Predicted LIDAR Depth Estimation

Accurate depth prediction is useful for many autonomous vehicle (AV) applications such as objects detection in 3D or other suitable computer vision (CV) algorithms. The 3D points of the LIDAR image that were scanned close to a captured image can be approximately projected, using known calibration parameters, onto an image space. However, due to the limited sensing scope, interference from the environment, and economic considerations, the resulting image space is incomplete as not every pixel can be accurately correlated with depth data, and thus contains "sparse" depth image data. The sparse depth image data thus represents an incomplete set of depth measurements due to the aforementioned limitations inherent in the sensors used as well as practical considerations. However, dense depth maps, which include a more complete set of depth data (e.g. per each pixel or a substantial portion of the pixels in the depth image such as 80%, 90%, etc.) are preferred or required for many computer-vision related tasks.

Thus, a technique to predict depth per pixel for a target image during training may include recording data with LIDAR sensor data, which may then be synced and calibrated with images from a video stream from a camera. The resulting data can be used to provide depth information for objects detected in the images. A common approach to predict depth per pixel using Lidar and image data involves supervising a model during training to determine the 3D points of the LIDAR that were scanned close to the image "grabbing" to produce the sparse depth image. Then, the sparse depth image data may be used to train different models to perform various tasks such as Monocular (Mono) depth estimation, Stereo-based depth estimation, and LIDAR completion.

Mono-depth estimation is a monocular frame-to-frame estimation methodology providing a high quality visual odometry. Mono-depth estimation may implement LIDAR point cloud data to train the depth map, and the predicted depth map is then used to perform depth-related tasks such as object detection. Stereo-based depth estimation techniques include GCNet, StereoNet and PSMNet, for example, which leverage stereo matching via images obtained via a stereo camera set (one or more camera pairs) to obtain depth data as an alternative to LIDAR.

In any event, the trained image models are typically supervised to minimize a difference between their output and the sparse LIDAR depth image (or other type of depth image) for the desired pixels (e.g. labeled LIDAR pixels). However, such conventional training approaches to perform such depth image predictions from sparse LIDAR depth images have various drawbacks. For instance, an inherent attribute of common LIDAR sensors is that their scanning pattern is structured, i.e. the sparse depth image of the LIDAR projection has a distinct scan line pattern rather than a random sample of the desired dense depth image. This attribute introduces an issue for training the generator models used for predicting depth per pixel. For instance, because this pattern is predictable, especially when the depth is known (or accurately estimated), the generator model can be used to predict where (i.e. which pixels) will be "supervised." In doing so, the generator model may function to behave differently at pixels in which the model will be supervised versus pixels in which the generator model will not be supervised. As a result, the predicted output outside the scan lines is significantly worse. Specifically, for a LIDAR completion task, this pattern is even more predictable, as some of the pattern appears in the input, both at training and at inference time.

A common approach is thus to drop some of the LIDAR points from the input during training so that the model will learn to predict the points it does not receive at the input using the points that the model does receive, in addition to the target image or region of interest (ROI). Other previous solutions to address this issue include using an aggregation of multiple LIDAR scans to make the image denser and to avoid the patterns, e.g. using photometric loss and a "smoothness" term in the loss. However, such aggregations are complex processes, and yield their own disadvantages with respect to moving objects and occlusions. Moreover, photometric and smoothness terms often add non-accurate "priors" that affect the accuracy of the models used.

The aspects described herein function to address these issues and improve upon the usage of LIDAR supervision to perform image depth estimation. For purposes of brevity and ease of explanation, the aspects are described herein with respect to performing a LIDAR completion task, although this is by way of example and not limitation. For example, the generator models as discussed herein may receive any suitable number and/or type of data based upon sensors in addition to or other than the camera-based image(s) and/or the LIDAR-based sparse depth images, such as radar, ultrasonic sensors, etc. Continuing the example of the use of LIDAR-based images, the LIDAR completion task is to predict a dense depth image while using sparse LIDAR images and/or other images (e.g. the camera images) as input (and not just as supervision during training). But again, an inherent attribute of some common LIDAR sensors is that their scanning pattern is structured, i.e. the sparse depth image of the LIDAR projection has a distinct scan pattern (e.g. scan lines) rather than resembling a random sample of a desired dense depth image. This attribute introduces an issue for training the above model for such purposes.

It would be appreciated that some active depth sensing systems, such as LIDAR or structured light imaging system (sometimes referred to as active triangulations systems) involve projection of a pattern onto an environment (from a known location and/or at a known time). The projected signal or pattern impinges upon objects in the environment and is reflected (at least in part) towards a sensor (or sensors)

of the active depth sensing system. The sensor senses this reflection of the projected pattern from objects in the environment and the sensed signal can thus be processed to provide 3D coordinates for objects in the environment. Because active depth sensing systems use a patterned projected signal (LIDARs use a scan pattern which is often comprised of scan lines and structured light projectors project a temporal or spatial series of lines or of 2D patterns). Aspects described herein can apply to scan lines as well as to 2D scan patterns of LIDARs and/or structured light patterns.

The aspects discussed herein may be implemented in accordance with any suitable type of device for which it is beneficial to perform such estimations using, for instance, acquired camera image and/or sparse LIDAR image data. The aspects described herein may be particularly advantageous, for instance, when used as part of the machine vision algorithms that are implemented to perform autonomous and/or semi-autonomous functions, which may be used by vehicles and/or other agents operating in a particular environment (e.g. a road scene) that is sensed via the use of image acquisition (e.g. using cameras) and LIDAR sensors.

For example, the aspects as discussed herein may be implemented to produce one or more trained models that, when deployed as part of the safety system 200 of the vehicle 100, enable the vehicle 100 to perform per-pixel depth estimation using the one or more image acquisition devices 104 and/or the LIDAR sensors 112. Although the aspects are discussed in the context of an AV and using LIDAR sensor data, this is by way of example and not limitation. The aspects as discussed herein may be extended to any suitable type of training to provide depth estimation or the use of such trained systems with which depth estimation is to be performed, and which the source data may include inherent patterns that may negatively impact the training and inference processes using models trained with such data.

To implement the aspects as described herein, one or more deployable models are generated that function to enable the AV 100 to perform per-pixel depth estimation using the one or more image acquisition devices 104 and/or the LIDAR sensors as described above, e.g. by applying one or more trained model to the newly-acquired data. Thus, during the training stage, two models are trained in parallel with one another until predetermined constrains are met, and then the model of interest is used for deployment purposes (i.e. the model which is actually applied and used in the relevant system) while the other model is no longer needed. The model to be deployed is referred to herein as the main or generator model, which is trained to perform a specific task in parallel with another model that is referred to herein as an "adversary."

For example, and as further discussed below, given the generator model output (e.g. a predicted dense depth image) the adversary model is trained to predict a per-pixel probability that a LIDAR label exists for each pixel in the predicted dense depth image. The adversary model is thus supervised by the occupancy of the same sparse depth image that is used to train the generator model. In this way, the generator model is trained to both minimize the difference between its output and the sparse LIDAR depth image and to maximize the adversary model loss. As a result, when the generator model behaves differently for pixels that are on the pattern (e.g. on the scan lines) and outside of them, the adversary can minimize its loss, which drives the generator model to avoid this discrepancy as it is tasked to maximize the same loss. In various aspects, the adversary architecture may be such that its ability to predict the per-pixel probability will be local (a small receptive field), so that the adversary may be unable to use global features. In other words, in accordance with the aspects provided herein, adversarial loss is used during training to "compete" against the aforementioned phenomenon of LIDAR sensor data having a structured or lined pattern.

The aspects described herein function to address these issues and improve upon the usage of LIDAR supervision to perform image depth estimation. These aspects may be implemented in accordance with any suitable type of device for which it is beneficial to perform such estimations using, for instance, acquired image data. The aspects described herein may be particularly advantageous, for instance, when used as part of the machine vision algorithms that are implemented to perform autonomous and/or semi-autonomous functions, which may be used by vehicles and/or other agents operating in a particular environment (e.g. a road scene) that is sensed via the use of image acquisition (e.g. using cameras) and LIDAR sensors.

For example, the aspects as discussed herein may be implemented to produce one or more trained models that, when deployed as part of the safety system 200 of the vehicle 100, enable the vehicle 100 to perform per-pixel depth estimation using the one or more image acquisition devices 104 and/or the LIDAR sensors 112. Although the aspects are discussed in the context of an AV and using LIDAR sensor data, this is by way of example and not limitation. The aspects as discussed herein may be extended to any suitable type of training for which depth estimation is to be performed, and which the source data may include inherent patterns that may negatively impact the training and inference processes using models trained with such data.

Figure 3:
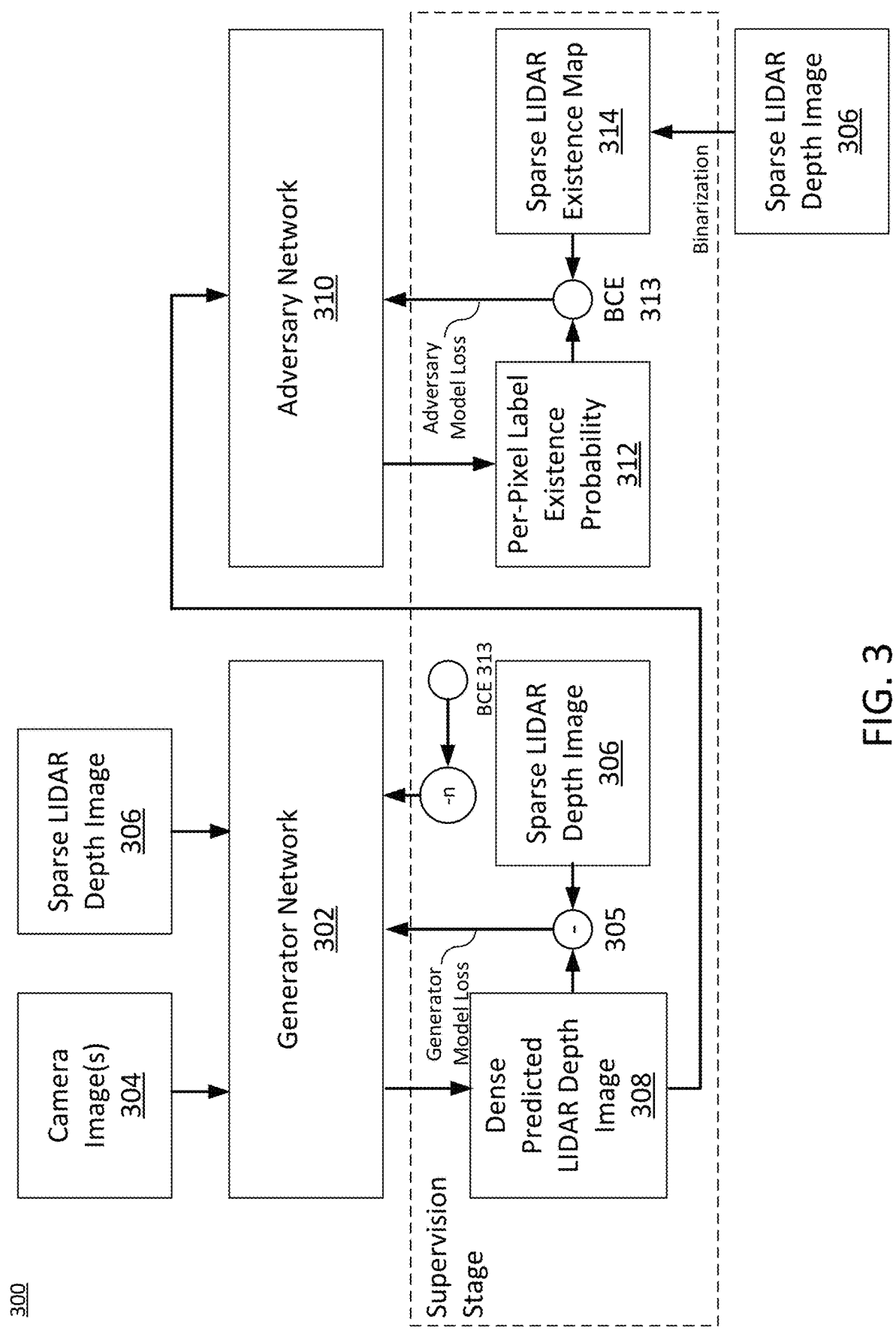
FIG. 3 illustrates an example system, in accordance with one or more aspects of the disclosure.

FIG. 3 illustrates an example of a system, in accordance with one or more aspects of the disclosure. The system as shown in FIG. 3 describes an overall process in which one or more models are trained for use in performing respective tasks. For instance, the system 300 may function to train a model that is used in accordance with depth estimation when subsequently deployed in the AV safety system 200 as described herein. Thus, the one or more models trained via the system 300 as shown in FIG. 3 may be deployed to and subsequently implemented via any suitable number and/or type of processors of the vehicle 100 and safety system 200 as discussed above. For instance, the one or more trained models may be deployed and used by the one or more processors 102, the one or more application processors 214A, 214B, etc. (one or more of which may form part of or the entirety of a vehicle controller) to perform various tasks at inference.

In this way, the model that is trained via the system 300 functions to facilitate the execution of relevant tasks to be performed when deployed in the vehicle 100. This may include performing depth estimation, or other suitable tasks, using one or more sensor data sources. For instance, the trained models may be used to perform inferences to realize various tasks related to predicting depth estimation using one or more sensor sources. This may include for example using a camera image source (e.g. the one or more image acquisition devices 104) that may provide RGB or other suitable composite images, the use of a sparse LIDAR depth image (e.g. acquired via the one or more LIDAR sensors 112), or a combination of both of these image types. To provide additional examples, the camera images may be stereo or calibrated images, which again may be used alone or in combination with other sensor data types such as sparse LIDAR depth images, for instance. For example, the sparse LIDAR depth image 306 is used during training as part of the supervision stage for the generator model. In various aspects, the sparse LIDAR depth image 306 and/or the camera image(s) 304 may also be input to the generator network 302 and used as part of the generator model training process. Thus, the generator model may be trained to perform LIDAR completion using any combination of suitable inputs to the generator network 302, which may represent the sensor data that is available to the AV 100 once the generator model is deployed. The generator model is then supervised as part of this training process using the sparse LIDAR depth image 306 in parallel with the additional constraints provided via the parallel training of the adversary model as discussed herein.

In any event, the system 300 illustrates a block diagram of an overview of a model training system, in accordance with various aspects of the disclosure. The system 300 may include various stages (also referred to as functional blocks), which perform the functions as described herein. In some instances, which are described in further detail below, the functions performed by the respective functional blocks may be implemented via any suitable type of processing circuitry or other suitable components. The functionality assigned to the functional blocks of the system 300 as discussed herein is provided for ease of explanation and is non-limiting. The functional blocks associated with the system 300 may be identified with one or more of the processors of the safety system 200 implemented via the vehicle 100 as discussed herein (e.g. the one or more processors 102 may include one or more application processors 214A, 214B, an image processor 216, a communication processor 218, etc.). To provide additional examples, the functional blocks of the system 300 may be identified with a computing device separate from the vehicle 100, which may include one or more computing devices and/or separate processing components that communicate with a suitable infrastructure (cloud-based servers and/or computers), such that the functional aspects of the system 300 may be implemented. To provide an illustrative example, the system 300 may be identified with a generative adversarial network (GAN) architecture.

Regardless of the particular implementation, the functional aspects of the system 300 may be performed via execution of machine-readable code, applications, algorithms, instructions, etc., via the processing circuitry of any suitable components of the relevant implemented computing device. Thus, the aspects of the functional blocks as discussed herein with reference to FIG. 3 may be executed as algorithms or other suitable automated processes. Moreover, and although not illustrated in detail for purpose of brevity, the system 300 may include any suitable number and/or type of interconnections between various components such as ports, buses, wires, wired or wireless links, etc. The interconnections may thus facilitate the transfer of data between the various functional blocks of the system 300. In some instances, such interconnections may be considered part of the software flow such as back-propagation paths, connections between the various layers implemented via the generator network 302 and the adversary network 310, etc.

In an aspect, the generator network 302 may be implemented in accordance with any suitable architecture that may be used to train a generator model. This may include, for instance, any suitable type of neural network or machine learning algorithm that is suitable for receiving images as inputs and providing images as outputs (e.g. a convolutional neural network (CNN) such as a Deep U-Net CNN), a shallow U-Net CNN, etc. The generator network 302 may have any suitable number of inputs, input layers, hidden layers, output layers, etc. The generator network 302 is shown in FIG. 3 as receiving separate inputs. The first of these inputs is identified with the camera image(s) 304, which corresponds to images generated via a suitable camera-based sensor (e.g. an RGB or grayscale image of a road scene). The generator network 302 also receives a second corresponding sparse LIDAR depth image 306, which again is considered "sparse" with respect to a projection of LIDAR point cloud data to image space. The camera images 304 and the sparse LIDAR depth image 306 correlate to one another in a synchronized manner, i.e. the sparse LIDAR depth image 306 represents LIDAR sensor data that has been recorded at the same time as the corresponding camera image(s) 304. The sparse LIDAR depth image 306 and the corresponding camera image(s) 304 may be registered or otherwise aligned such that overlapping regions between the two images are accounted for and the images correlate to one another in terms of both temporally and spatially. Using this data, the generator network 302 generates a model that outputs a dense predicted LIDAR depth image 308 that includes labels identifying depth data per pixel in the sparse LIDAR depth image 306.

As shown in FIG. 3, during the supervision stage, the dense predicted LIDAR depth image 308 output in this manner is compared to a subset of pixels of the sparse LIDAR depth image 306. That is, the sparse LIDAR depth image 306 may contain depth data labels for a subset of its pixels, the labels identifying a specific depth value for each respectively labeled pixel, which are referred to herein as depth data pixels or, alternatively, as non-ignored pixels. The remaining subset of pixels for which depth data is not available are identified with an "ignore" label, and referred to herein as ignore pixels. The non-ignored pixels are generally identified with a distinct pattern in the image (e.g. the scan lines). For each of the depth data pixels in the sparse LIDAR depth image 306, the difference between each depth value is then computed via the difference block 305 and fed back into the generator network as part of the back-propagation process. This process continues iteratively until the resulting difference between the dense predicted LIDAR depth image 308 (generated via the generator network 302) and the sparse LIDAR depth image 306 (from the training data), referred to as loss, is less than a predetermined threshold metric, in which case the loss is said to be minimized. The generator model loss may be computed in this manner using any suitable type of techniques to do so, including known techniques. As one example, the L1 Loss Function may be implemented to identify the difference between the depth data pixels in the sparse LIDAR depth image 306 and the dense predicted LIDAR depth image 308.

In other words, the supervision stage functions to "punish" or penalize the generated model via back-propagation when the dense predicted LIDAR depth image 308 deviates from the sparse LIDAR depth image 306. One or more generator models may thus be trained in accordance with the different combinations of the camera images 104 and/or the sparse LIDAR depth images 306. Thus, once the one or more generator models are trained in this way, the generator models may be implemented via an AV or other suitable component to facilitate the performance of a set of various depth prediction tasks. That is, at inference time for each respective task, a respectively trained generator model may be used in accordance with one or both of the image types that were used during training (i.e. camera images, sparse LIDAR depth images, or both), depending upon the particular depth prediction task that is needed (i.e. whether the depth prediction is required from camera images, LIDAR sensor data, or both sensor sources).

In other words, the generator network 302 is configured to train a generator model that outputs a dense predicted LIDAR depth image 308 that identifies depth data per pixel using training data that includes camera images 304 and a corresponding sparse LIDAR depth image 306. However, because the sparse LIDAR depth image 306 may include a pattern (e.g. of scan lines), which is a function of the hardware used to collect the LIDAR images, the generator network 302 may exploit this pattern such that the resulting dense predicted depth image is not smooth. This is a result of the back-propagation not adequately "punishing" or penalizing the generator model because the pattern (e.g. the scan lines) are present in both the dense predicted LIDAR depth image 308 and the sparse LIDAR depth image 306. As a result, the trained generator model, once deployed and used at inference, may result in dense predicted depth images that mirror (or are otherwise adversely influenced by) this pattern, thereby resulting in inaccurate pixel labels.

To address this issue, the aspects as discussed herein introduce an adversary network 310, which functions to train an adversary model in parallel with the training of the generator model. As further discussed below, the training of the adversary model in parallel with the generator model enables the generation of a final trained generator model that compensates for the patterns in the sparse LIDAR depth image training data. The adversary network 310 may thus be implemented in accordance with any suitable architecture that may be used to train an adversary model. This may include, for instance, any suitable type of neural network and/or architecture as noted above for the generator network 302, and may be the same type of architecture as the generator network 302 or a different type of architecture, in various aspects.

Thus, during the same iteration of a training cycle (i.e. during the same step in the training "loop"), the dense predicted LIDAR depth image 308 output via the generator network 302 is fed as an input to an adversary network 310. The adversary network 310 is configured to generate, from this input, a per-pixel label existence probability image 312. The per-pixel label existence probability image 312 represents a prediction (i.e. a probability value) for each of the pixels for which a label was identified from the supervision stage of the generator network 302. In other words, for each pixel in the dense predicted LIDAR depth image 308, the adversary network 310 outputs a prediction of whether a valid label (i.e. the pixel is not ignored) is identified by the supervision stage of the generator network 302.

The supervisor stage of the adversary network 310 thus compares each pixel label prediction of the per-pixel label existence probability image 312 with a sparse LIDAR existence map 314, which is generated from a binarization of the sparse LIDAR depth image 306. The sparse LIDAR existence map 314 represents a binarized image in which each of the depth data pixels from the sparse LIDAR depth image 306, regardless of the depth value, is converted to a first binary value, with the ignored pixels being converted to a second, complementary binary value. In other words, the sparse LIDAR existence map 314 represents a binary "mask" of the sparse LIDAR depth image 306 that identifies only validly supervised pixels, i.e. only un-ignored pixels that have some label identifying a depth value. Thus, the adversary network 310 performs a binary task to determine, for each pixel in the dense predicted LIDAR depth image 308, whether that pixel will be supervised (i.e. the pixel is identified with one of the depth data pixels) or unsupervised (i.e. the pixel is ignored).

The adversary network 310 is configured to minimize an adversary model loss, which is measured in the present example as a result of a mean of the Binary-Cross-Entropy (BCE) per-pixel between the per-pixel label existence probability image 312 and the sparse LIDAR existence map 314. Therefore, the adversary network 310 training process iteratively continues until the BCE loss (i.e. the adversary model loss in this example) is less than a predetermined threshold metric, in which case the loss is said to be minimized.

Conversely, the generator network 302 is configured to minimize its own loss (i.e. the generator model loss) while maximizing the loss of the adversary network 310. Therefore, aspects include the back-propagation constraints of the generator model 302 being two-fold. The first is to minimize the generator model loss, which is a mean of per-pixel difference between the output of the generator model (i.e. the dense predicted LIDAR depth image 308) and the sparse LIDAR depth image 306 at pixels where a LIDAR label exists (i.e. the depth data pixels). The second is to maximize the loss of the adversary model, which may be achieved as shown in FIG. 3 via the minimization of the adversary model loss after a multiplication of the adversary model loss, which is represented as the −n block.

Figure 4:
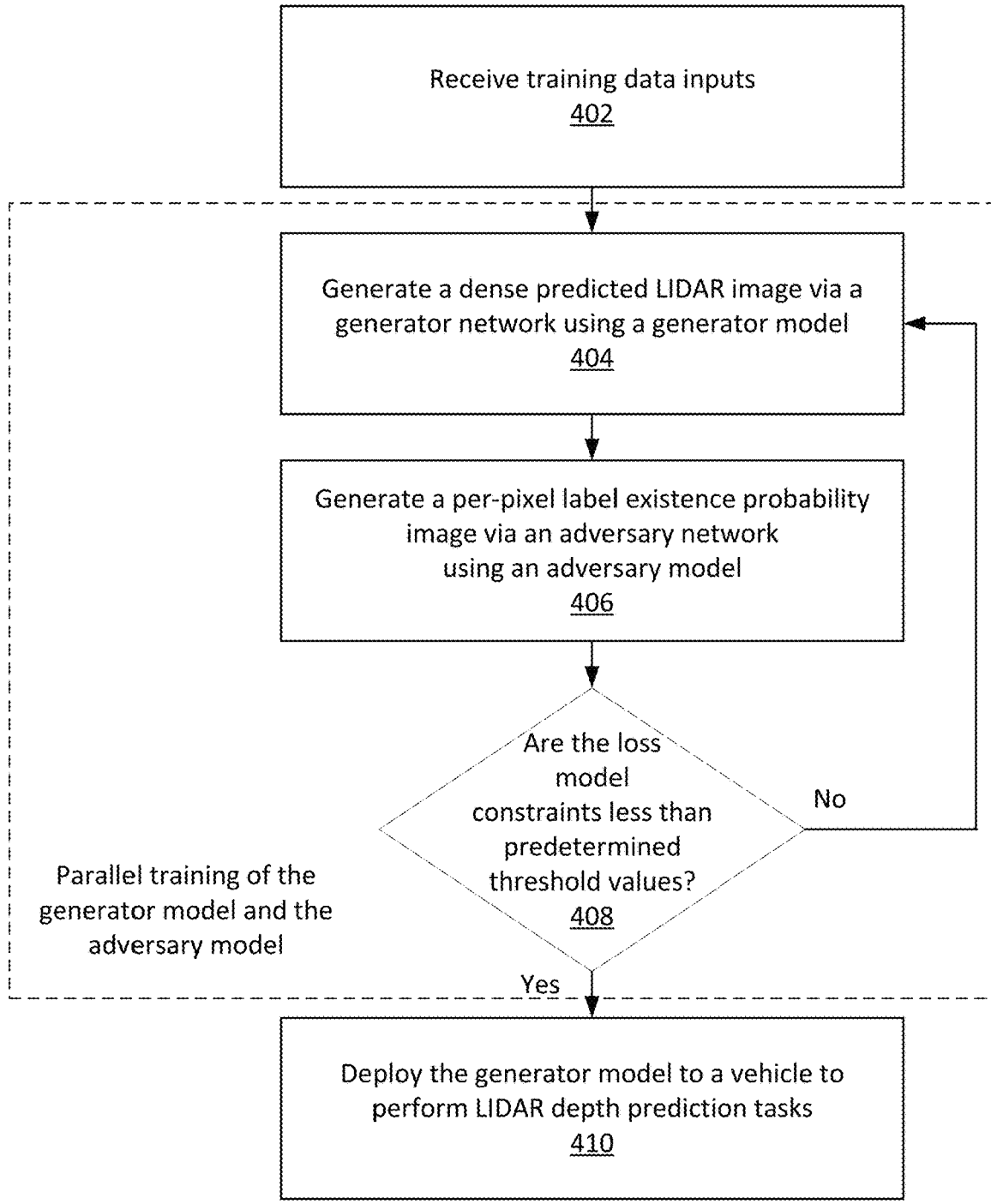
FIG. 4 illustrates an example of a process flow, in accordance with one or more aspects of the disclosure.

FIG. 4 illustrates an example of a process flow, in accordance with one or more aspects of the disclosure. With reference to FIG. 4, the process flow 400 may be a computer-implemented method executed by and/or otherwise associated with one or more processors (processing circuitry) and/or storage devices. These processors and/or storage devices may be associated with one or more components of the system 300 as discussed herein and/or one or more components of the computing device 500 as discussed herein. The processors and/or storage devices may be identified with the one or more networks of the system 300, such as the generator network 302, the adversary network 310, etc. The flow 400 may include alternate or additional steps that are not shown in FIG. 4 for purposes of brevity, and may be performed in a different order than the steps shown in FIG. 4.

Flow 400 may begin when one or more processors receive (block 402) training data inputs. The training data inputs may be provided, for example, to the generator network 302 as shown and discussed with respect to FIG. 3. Thus, the training data inputs may include one or more camera images 304, the sparse LIDAR depth image 306, etc., and may additionally or alternatively include other suitable types of data depending upon the particular generator model that is to be trained. The training data inputs may be received (block 402) via the generator network using any suitable number and/or type of input layers, depending upon the particular implementation of the generator network 302.

Flow 400 may include one or more processors generating (block 404) a dense predicted LIDAR image. This may include, for example, the dense predicted LIDAR depth image 308 as shown and discussed herein with reference to FIG. 3, which is generated via the generator network 302 by applying the most current iteration of the generator model to the received inputs.

Flow 400 may include one or more processors generating (block 406) a per-pixel label existence probability image. This may include, for example, the dense predicted LIDAR depth image 312 as shown and discussed herein with reference to FIG. 3, which is generated via the adversary network 310 by applying the most current iteration of the adversary model to the dense predicted LIDAR depth image 308, which is received as an input. Again, the dense predicted LIDAR depth image 312 represents a prediction (i.e. a probability value) regarding a label being identified from the supervision stage of the generator network 302 (versus being ignored).

Flow 400 may include one or more processors determining (block 408) whether the model loss constraints are less than predetermined threshold values. This may include, for instance, the determination of whether the generator model loss is less than a predetermined loss threshold, and likewise if the adversary loss is greater than a predetermined threshold loss value, as shown and discussed herein with reference to FIG. 3. These predetermined generator model loss and adversary model loss threshold values may be any suitable values based upon the desired performance of the generator model, the time allocated to perform model training, the particular application, the expected LIDAR depth estimation tasks to be performed, etc. Thus, the blocks 404, 406, and 408 represent the parallel iterative training process of the generator model and the adversary model as discussed herein. That is, the loop formed by the blocks 404, 406, 408 may represent iteratively training, in parallel, the generator model via the generator network 302 based upon the dense predicted LIDAR depth image 308, and the adversary model via the adversary network 310 based upon the per-pixel label existence probability image 312. In this way, the generator model and the adversary model are trained together until the generator model loss and the adversary model loss each meet a respective model loss constraint.

Once the generator model loss and the adversary model loss constraints are met, the process flow 400 includes deploying (block 410) the generator model to a vehicle to perform LIDAR depth prediction using data generated via one or more sensors implemented in the vehicle. The adversary model is no longer needed for deployment purposes.

Figure 5:
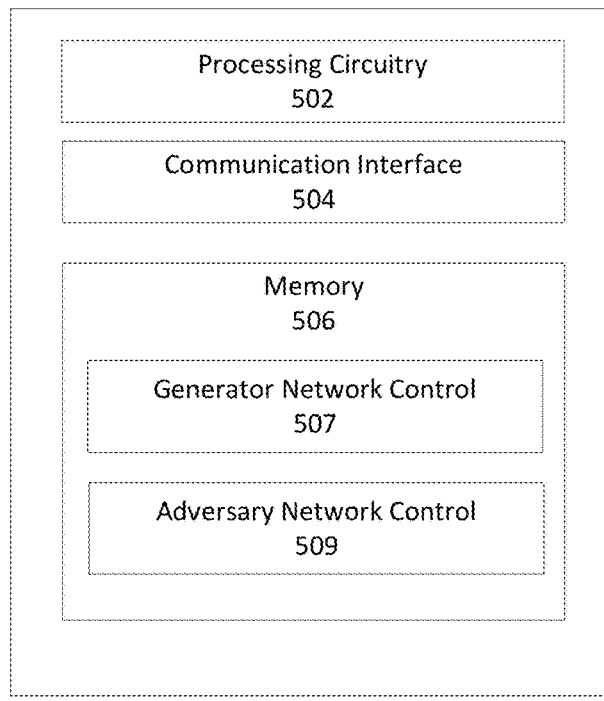
FIG. 5 illustrates an example device, in accordance with one or more aspects of the disclosure.

FIG. 5 illustrates a block diagram of an exemplary computing device, in accordance with aspects of the disclosure. In an aspect, the computing device 500 as shown and described with respect to FIG. 5 may be identified with a component of the safety system 200 as discussed herein, or a separate computing device that may be implemented within the vehicle 100 or in any separate suitable environment. In various aspects, the computing device 500 may be identified with any suitable type of standalone computing device such as a desktop computer, laptop, server computer, tablet computer, mobile device, or components thereof such as a GPU, CPU, etc. As further discussed below, the computing device 500 may perform the various functionality as described herein with respect to the system 300 and the process flow 400. To do so, the computing device 500 may include processing circuitry 502, a communication interface 504, and a memory 506. The components shown in FIG. 5 are provided for ease of explanation, and the computing device 500 may implement additional, less, or alternative components as those shown in FIG. 5.

The processing circuitry 502 may be configured as any suitable number and/or type of computer processors, which may function to control the computing device 500 and/or other components of the computing device 500. The processing circuitry 502 may be identified with one or more processors (or suitable portions thereof) implemented by the computing device 500, and may include processors identified with the safety system 200 as discussed herein (e.g. the one or more processors 102, one or more of the processors 214A, 214B, 216, 218, etc.) The processing circuitry 500 may be identified with one or more processors such as a host processor, a digital signal processor, one or more microprocessors, graphics processors, a graphics processing unit (GPU), baseband processors, microcontrollers, an application-specific integrated circuit (ASIC), part (or the entirety of) a field-programmable gate array (FPGA), etc.

In any event, the processing circuitry 502 may be configured to carry out instructions to perform arithmetical, logical, and/or input/output (I/O) operations, and/or to control the operation of one or more components of computing device 500 to perform various functions as described herein, such as the process flow 400 for example. The processing circuitry 502 may include one or more microprocessor cores, memory registers, buffers, clocks, etc., and may generate electronic control signals associated with the components of the computing device 500 to control and/or modify the operation of these components. The processing circuitry 502 may communicate with and/or control functions associated with the communication 504 and/or the memory 506.

The processing circuitry 502 may be configured as any suitable number and/or type of components configured to facilitate the computing device 500 performing the various functions as discussed herein such as the training of a generator model and an adversary model in parallel with one another. Thus, the processing circuitry 502 may be identified with the architecture of any suitable type of neural network or other suitable system (e.g. the system 300) configured to perform machine learning model training. Thus, the processing circuitry 502 may be configured to control the overall training process and/or to perform the iterative training process. For instance, the processing circuitry 502 may include one or more GPUs and/or other processor components suitable for these tasks.

The communication interface 504 may be implemented as any suitable number and/or type of components that function to interface with additional devices, and may implement for instance buses, ports, data interfaces, memory controllers, etc. The communication interface 504 may form part of an overall communication circuitry implemented by the computing device 500, which may communicate with other computing devices to receive and/or transmit data. For instance, the communication interface 504 may facilitate the computing device 500 receiving the training data as discussed herein with respect to the system 300, providing the input to the adversary network 310, passing data between the general network 302 and the adversary network 310, transmitting the trained generator model for deployment in a suitable vehicle, etc.

The memory 506 is configured to store data and/or instructions such that, when the instructions are executed by the processing circuitry 502, cause the computing device 500 (or the vehicle 100 and/or safety system 200 of which the computing device 500 may form a part) to perform various functions as described herein. The memory 506 may be implemented as any well-known volatile and/or non-volatile memory, including, for example, read-only memory (ROM), random access memory (RAM), flash memory, a magnetic storage media, an optical disc, erasable programmable read only memory (EPROM), programmable read only memory (PROM), etc. The memory 506 may be non-removable, removable, or a combination of both. The memory 506 may be implemented as a non-transitory computer readable medium storing one or more executable instructions such as, for example, logic, algorithms, code, etc.

As further discussed below, the instructions, logic, code, etc., stored in the memory 506 are represented by the various modules as shown in FIG. 5, which may enable the various functions of the aspects as described herein to be functionally realized. Alternatively, if implemented via hardware, the modules shown in FIG. 5 associated with the memory 506 may include instructions and/or code to facilitate control and/or monitor the operation of such hardware components. In other words, the modules as shown in FIG. 5 are provided for ease of explanation regarding the functional association between hardware and software components. Thus, the processing circuitry 502 may execute the instructions stored in these respective modules in conjunction with one or more hardware components to perform the various functions as discussed herein. For example, the processing circuitry 502 may execute the instructions stored in the various modules realize the architecture and functionality of a neural network or other machine learning training system.

The generator network control module 507 may execute the functionality as discussed herein with reference to the generator network 302 as shown in FIG. 3. The executable instructions stored in the perception analysis module 507 may facilitate, in conjunction with execution via the processing circuitry 502, the computing device 500 receiving training data, generating the dense predicted LIDAR depth image 308, computing the generator model loss, and using the generator model loss and the adversary model loss via back-propagation to iteratively refine the generator model to obtain the trained generator model for deployment.

The adversary network control module 509 may execute the functionality as discussed herein with reference to the adversary network 310 as shown in FIG. 3. The executable instructions stored in the adversary network control module 509 may facilitate, in conjunction with execution via the processing circuitry 502, the computing device 500 receiving the dense predicted LIDAR depth image 308, generating the per-pixel label existence probability image 312, computing the adversary model loss, computing the sparse LIDAR existence map 314, and using the adversary model loss via back-propagation to iteratively generate the per-pixel label existence probability image 312 to compete against the generator network 302, as discussed herein.

Figure 6:
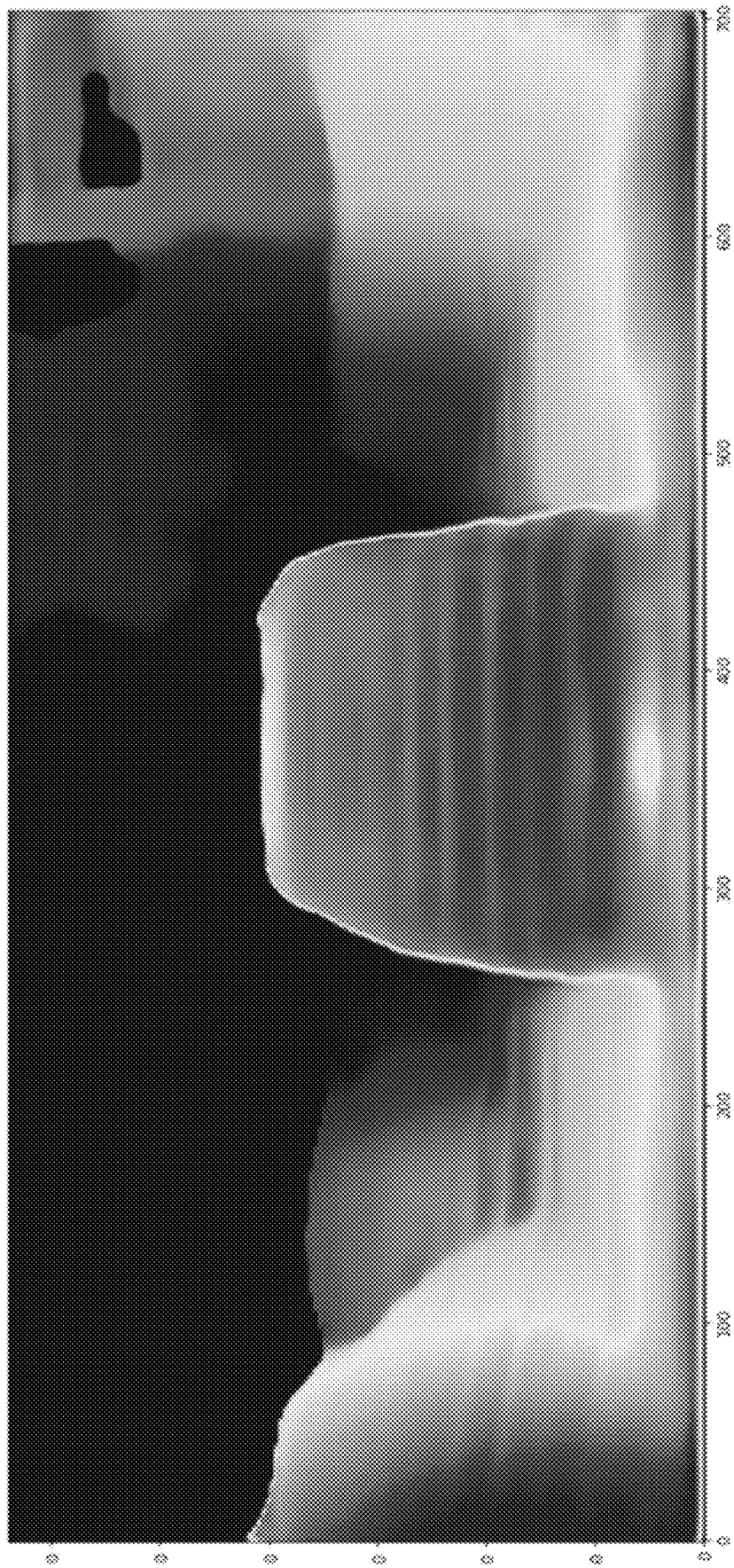
FIG. 6 illustrates an example image generated without the introduction of adversary model loss introduced in accordance with one or more aspects of the disclosure.
Figure 7:
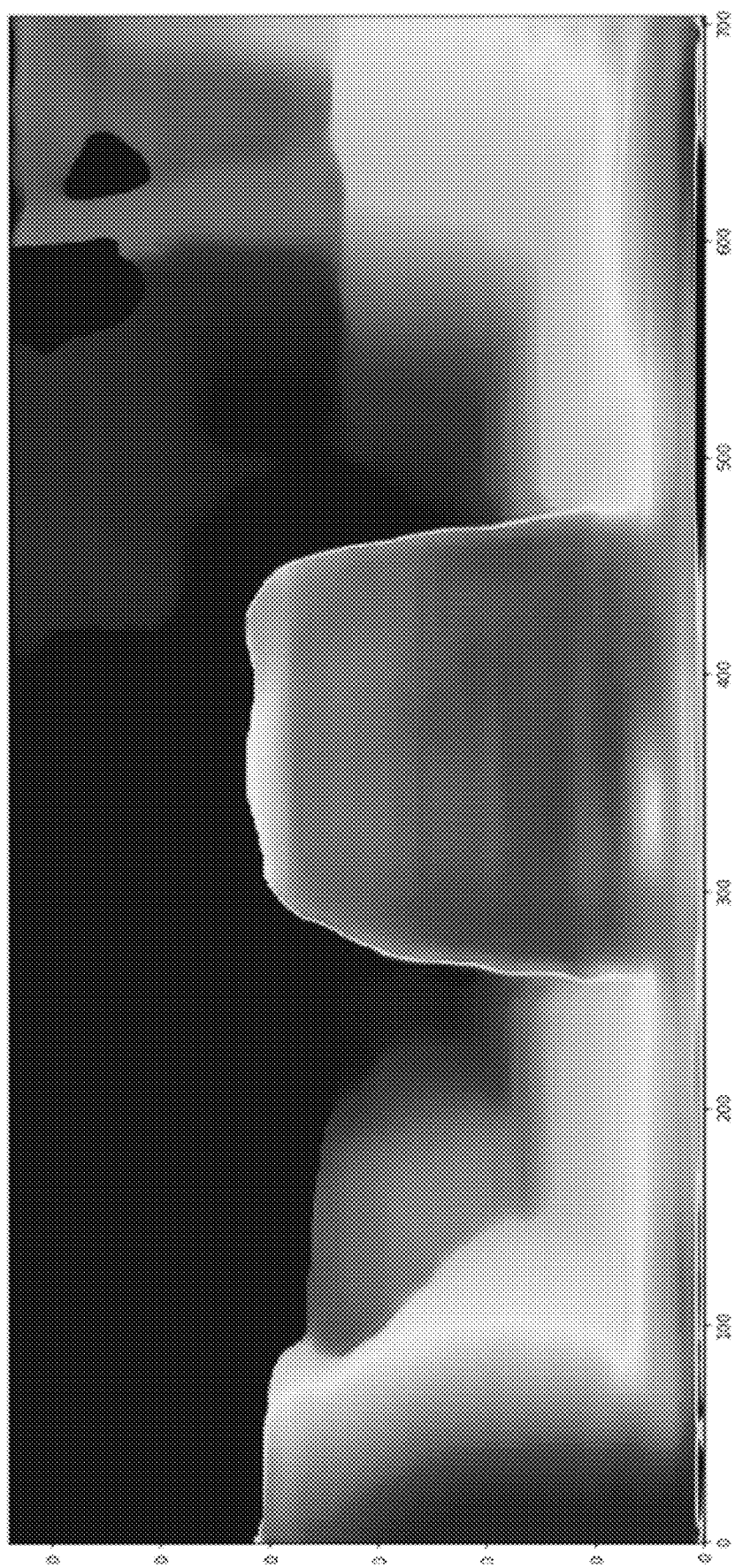
FIG. 7 illustrates an example image generated with the adversary model loss introduced in accordance with one or more aspects of the disclosure.

FIG. 6 illustrates an example image from a conventionally trained generator model without the introduction of adversary model loss in accordance with one or more aspects of the disclosure, whereas FIG. 7 illustrates an example image generated with the adversary model loss introduced in accordance with one or more aspects of the disclosure. The example shown in FIG. 6 is the image generated from a stereo-based depth estimation model as a baseline, and the example shown in FIG. 7 is an example of the dense predicted LIDAR depth image 308, which was generated via a generator model using the adversary model loss approach as discussed herein and shown in FIG. 3. By comparison of FIGS. 6 and 7, it can be observed that the image in FIG. 6 has a scan-line pattern that is much more visible compared to the image shown in FIG. 7. Thus, the impact of the adversary loss model as a constraint for generating the dense predicted LIDAR depth image 308 can be observed.

Figure 8:
FIG. 8 illustrates an example input image overlaid with a sparse LIDAR image, in accordance with one or more aspects of the disclosure.

FIG. 8 illustrates an example input image overlaid with a sparse LIDAR image, in accordance with one or more aspects of the disclosure. FIG. 8 shows an example of a reference image with the sparse LIDAR depth image 306 overlaid thereon, in which the scan-line pattern is illustrated.

Figure 9:
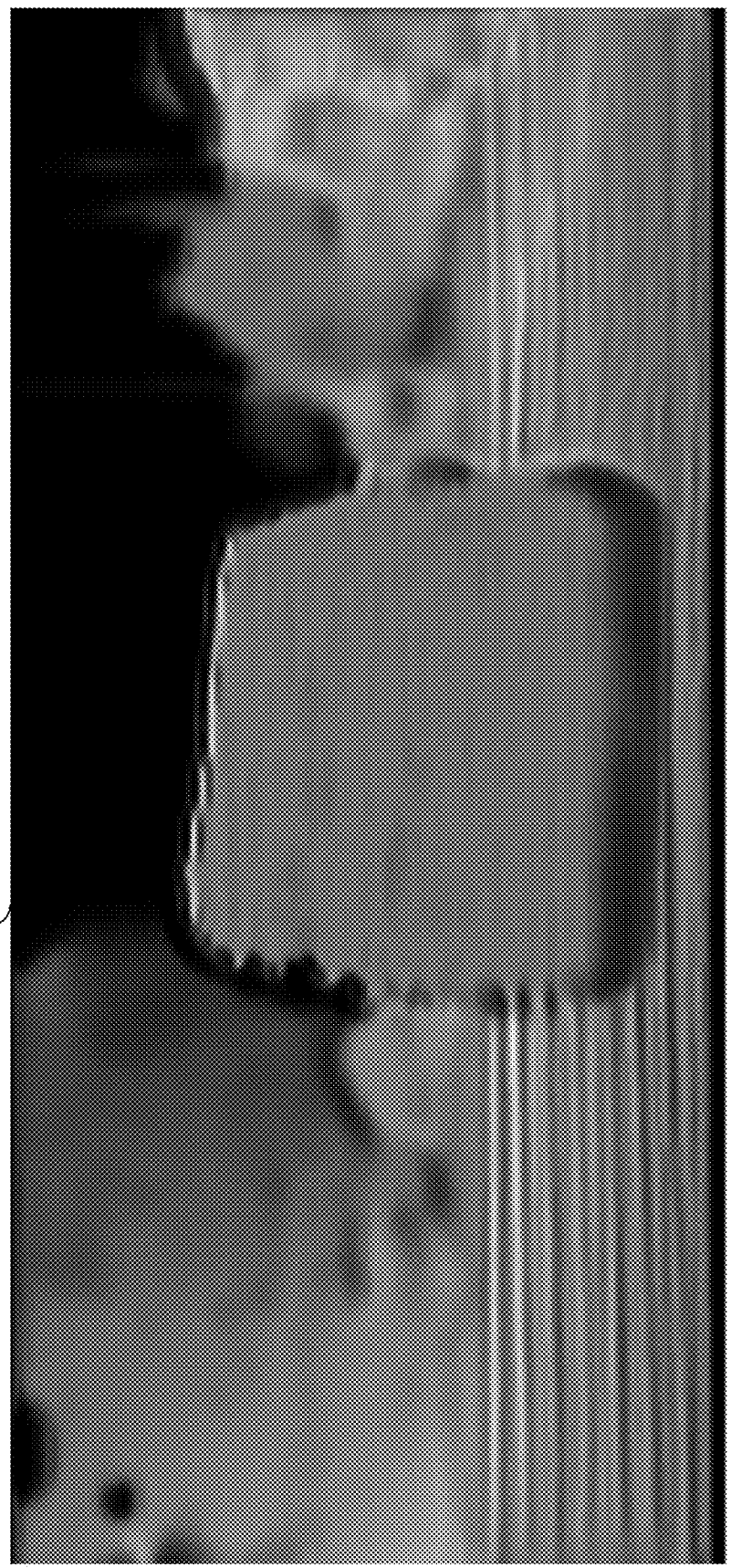
FIG. 9 illustrates an example image generated by an adversary model, in accordance with one or more aspects of the disclosure.

FIG. 9 illustrates an example image output by an adversary network, in accordance with one or more aspects of the disclosure. The example image as shown in FIG. 9 may be identified with the per-pixel label existence probability image 312 output by the adversary network 310 as shown in FIG. 3, for instance. For ease of explanation, it is noted that the image 900 as shown in FIG. 9 is from a different example image than those shown in FIGS. 6-8. However, the example image 900 as shown in FIG. 9 is not identical to the sparse LIDAR depth image 306, as will be the case if the adversary network 310 outputs the image under ideal or "perfect" operating conditions.

EXAMPLES

The following examples pertain to further aspects.

An example (e.g. example 1) is a method, comprising: generating, via a generator network, a dense predicted Light Detection and Ranging (LIDAR) depth image based upon receiving, as training data, inputs that include (i) a camera image that was generated via one or more cameras, and (ii) a corresponding sparse LIDAR depth image that was generated via one or more LIDAR sensors; generating, via an adversary network, a per-pixel label existence probability image based upon receiving the dense predicted LIDAR depth image as an input, the per-pixel label existence probability image representing, for each pixel in the dense predicted LIDAR depth image, a probability with respect to whether a predetermined label was identified from a supervision stage of the generator network; iteratively training in parallel (i) a generator model via the generator network based upon the dense predicted LIDAR depth image, and (ii) an adversary model via the adversary network based upon the per-pixel label existence probability image; and deploying the generator model to a vehicle to perform LIDAR depth prediction using data generated via one or more sensors implemented in the vehicle.

Another example (e.g. example 2) relates to a previously-described example (e.g. example 1), wherein the act of iteratively training in parallel the generator model and the adversary model comprises: iteratively modifying the generator model using a generator model loss and an adversary model loss as part of a back-propagation stage until (i) the generator model loss is less than a predetermined threshold generator model loss value, and (ii) the adversary model loss is greater than a predetermined threshold adversary model loss value.

Another example (e.g. example 3) relates to a previously-described example (e.g. one or more of examples 1-2), wherein the sparse LIDAR depth image comprises (i) a set of depth data pixels that are identified with depth data labels, and (ii) a set of ignored pixels that are identified with ignore labels for which depth data is not available, and further comprising: generating a sparse LIDAR existence map that assigns (i) a first binary value to the set of depth data pixels, and (ii) a second binary value to the set of ignored pixels.

Another example (e.g. example 4) relates to a previously-described example (e.g. one or more of examples 1-3), wherein the act of iteratively training the adversary model comprises: iteratively modifying the adversary model using an adversary model loss as part of a back-propagation stage, the adversary model loss being generated based upon a comparison between the per-pixel label existence probability image and the sparse LIDAR existence map.

Another example (e.g. example 5) relates to a previously-described example (e.g. one or more of examples 1-4), wherein the adversary model loss is generated based upon a binary-cross-entropy (BCE) per-pixel comparison between the per-pixel label existence probability image and the sparse LIDAR existence map.

Another example (e.g. example 6) relates to a previously-described example (e.g. one or more of examples 1-5), wherein the generator model loss is based upon a difference between (i) the dense predicted LIDAR depth image, and (ii) the corresponding sparse LIDAR depth image from the training data.

Another example (e.g. example 7) relates to a previously-described example (e.g. one or more of examples 1-6), wherein the act of iteratively training in parallel the generator model and the adversary model comprises: iteratively modifying the generator model until (i) the generator model loss is minimized, and (ii) the adversary model loss is maximized.

An example (e.g. example 8) is a computing device, comprising: a memory configured to store computer-readable instructions; and one or more processors configured to execute the computer readable instructions stored in the memory to: generate, via a generator network, a dense predicted Light Detection and Ranging (LIDAR) depth image based upon receiving, as training data, inputs that include (i) a camera image that was generated via one or more cameras, and (ii) a corresponding sparse LIDAR depth image that was generated via one or more LIDAR sensors; generate, via an adversary network, a per-pixel label existence probability image based upon receiving the dense predicted LIDAR depth image as an input, the per-pixel label existence probability image representing, for each pixel in the dense predicted LIDAR depth image, a probability with respect to whether a predetermined label was identified from a supervision stage of the generator network; and iteratively train in parallel (i) a generator model via the generator network based upon the dense predicted LIDAR depth image, and (ii) an adversary model via the adversary network based upon the per-pixel label existence probability image, wherein the generator model is deployed in a vehicle to perform LIDAR depth prediction using data generated via one or more sensors implemented in the vehicle.

Another example (e.g. example 9) relates to a previously-described example (e.g. example 8), wherein the computing device is configured to iteratively train in parallel the generator model and the adversary model by: iteratively modifying the generator model using a generator model loss and an adversary model loss as part of a back-propagation stage until (i) the generator model loss is less than a predetermined threshold generator model loss value, and (ii) the adversary model loss is greater than a predetermined threshold adversary model loss value.

Another example (e.g. example 10) relates to a previously-described example (e.g. one or more of examples 8-9), wherein the sparse LIDAR depth image comprises (i) a set of depth data pixels that are identified with depth data labels, and (ii) a set of ignored pixels that are identified with ignore labels for which depth data is not available, and wherein the computing device is configured to generate a sparse LIDAR existence map that assigns (i) a first binary value to the set of depth data pixels, and (ii) a second binary value to the set of ignored pixels.

Another example (e.g. example 11) relates to a previously-described example (e.g. one or more of examples 8-10), wherein the computing device is configured to iteratively train the adversary model by: iteratively modifying the adversary model using an adversary model loss as part of a back-propagation stage, the adversary model loss being generated based upon a comparison between the per-pixel label existence probability image and the sparse LIDAR existence map.

Another example (e.g. example 12) relates to a previously-described example (e.g. one or more of examples 8-11), wherein the adversary model loss is generated based upon a binary-cross-entropy (BCE) per-pixel comparison between the per-pixel label existence probability image and the sparse LIDAR existence map.

Another example (e.g. example 13) relates to a previously-described example (e.g. one or more of examples 9-12), wherein the generator model loss is based upon a difference between (i) the dense predicted LIDAR depth image, and (ii) the corresponding sparse LIDAR depth image from the training data.

Another example (e.g. example 14) relates to a previously-described example (e.g. one or more of examples 9-13), wherein the computing device is configured to iteratively train in parallel the generator model and the adversary model by: iteratively modifying the generator model until (i) the generator model loss is minimized, and (ii) the adversary model loss is maximized.

An example (e.g. example 15) is a non-transitory computer-readable medium having instructions stored thereon that, when executed by processing circuitry of a computing device, cause the computing device to: generate, via a generator network, a dense predicted Light Detection and Ranging (LIDAR) depth image based upon receiving, as training data, inputs that include (i) a camera image that was generated via one or more cameras, and (ii) a corresponding sparse LIDAR depth image that was generated via one or more LIDAR sensors; generate, via an adversary network, a per-pixel label existence probability image based upon receiving the dense predicted LIDAR depth image as an input, the per-pixel label existence probability image representing, for each pixel in the dense predicted LIDAR depth image, a probability with respect to whether a predetermined label was identified from a supervision stage of the generator network; and iteratively train in parallel (i) a generator model via the generator network based upon the dense predicted LIDAR depth image, and (ii) an adversary model via the adversary network based upon the per-pixel label existence probability image, wherein the generator model is deployed in a vehicle to perform LIDAR depth prediction using data generated via one or more sensors implemented in the vehicle.

Another example (e.g. example 16) relates to a previously-described example (e.g. example 15), wherein the computer-readable instructions, when executed by the processing circuitry, further cause the computing device to iteratively train in parallel the generator model and the adversary model by: iteratively modifying the generator model using a generator model loss and an adversary model loss as part of a back-propagation stage until (i) the generator model loss is less than a predetermined threshold generator model loss value, and (ii) the adversary model loss is greater than a predetermined threshold adversary model loss value.

Another example (e.g. example 17) relates to a previously-described example (e.g. one or more of examples 15-16), wherein the sparse LIDAR depth image comprises (i) a set of depth data pixels that are identified with depth data labels, and (ii) a set of ignored pixels that are identified with ignore labels for which depth data is not available, and wherein the computer-readable instructions, when executed by the processing circuitry, further cause the computing device to generate a sparse LIDAR existence map that assigns (i) a first binary value to the set of depth data pixels, and (ii) a second binary value to the set of ignored pixels.

Another example (e.g. example 18) relates to a previously-described example (e.g. one or more of examples 15-17), wherein the computer-readable instructions, when executed by the processing circuitry, further cause the computing device to iteratively train the adversary model by:

iteratively modifying the adversary model using an adversary model loss as part of a back-propagation stage, the adversary model loss being generated based upon a comparison between the per-pixel label existence probability image and the sparse LIDAR existence map.

Another example (e.g. example 19) relates to a previously-described example (e.g. one or more of examples 15-18), wherein the adversary model loss is generated based upon a binary-cross-entropy (BCE) per-pixel comparison between the per-pixel label existence probability image and the sparse LIDAR existence map.

Another example (e.g. example 20) relates to a previously-described example (e.g. one or more of examples 15-19), wherein the generator model loss is based upon a difference between (i) the dense predicted LIDAR depth image, and (ii) the corresponding sparse LIDAR depth image from the training data.

Another example (e.g. example 21) relates to a previously-described example (e.g. one or more of examples 15-20), wherein the computer-readable instructions, when executed by the processing circuitry, further cause the computing device to iteratively train in parallel the generator model and the adversary model by: iteratively modifying the generator model until (i) the generator model loss is minimized, and (ii) the adversary model loss is maximized.

An example (e.g. example 22) is a system, comprising: a memory configured to store computer-readable instructions; and one or more processors configured to execute the computer readable instructions stored in the memory to perform one or more Light Detection and Ranging (LIDAR) completion tasks by applying a trained generator model to received sensor data to predict dense depth image data, wherein the trained generator model is trained by: generating, via a generator network, a dense predicted LIDAR depth image based upon receiving, as training data, inputs that a sparse LIDAR depth image; generating, via an adversary network, a per-pixel label existence probability image based upon receiving the dense predicted LIDAR depth image as an input, the per-pixel label existence probability image representing, for each pixel in the dense predicted LIDAR depth image, a probability with respect to whether a predetermined label was identified from a supervision stage of the generator network; and iteratively training in parallel (i) the generator model via the generator network based upon the dense predicted LIDAR depth image, and (ii) an adversary model via the adversary network based upon the per-pixel label existence probability image.

Another example (e.g. example 23) relates to a previously-described example (e.g. example 22), wherein the act of iteratively training in parallel the generator model and the adversary model comprises: iteratively modifying the generator model using a generator model loss and an adversary model loss as part of a back-propagation stage until (i) the generator model loss is less than a predetermined threshold generator model loss value, and (ii) the adversary model loss is greater than a predetermined threshold adversary model loss value.

Another example (e.g. example 24) relates to a previously-described example (e.g. one or more of examples 22-23), wherein the sparse LIDAR depth image comprises (i) a set of depth data pixels that are identified with depth data labels, and (ii) a set of ignored pixels that are identified with ignore labels for which depth data is not available, and wherein the act of iteratively training in parallel the generator model and the adversary model comprises: generating a sparse LIDAR existence map that assigns (i) a first binary value to the set of depth data pixels, and (ii) a second binary value to the set of ignored pixels; and iteratively modifying the adversary model using an adversary model loss as part of a back-propagation stage, the adversary model loss being generated based upon a comparison between the per-pixel label existence probability image and the sparse LIDAR existence map.

Another example (e.g. example 25) relates to a previously-described example (e.g. one or more of examples 22-24), wherein the one or more processors are configured to execute the computer readable instructions stored in the memory to perform a navigation-related operation based on the dense predicted LIDAR depth image.

Another example (e.g. example 26) relates to a previously-described example (e.g. one or more of examples 22-25), wherein the one or more processors are configured to execute the computer readable instructions stored in the memory to perform the navigation-related operation by: generating an environmental model based at least in part on the dense predicted LIDAR depth image; and applying a driving policy model with the environmental model to determine the navigation-related operation to be performed by the vehicle.

An example (e.g. example 27) is a vehicle, comprising: a memory configured to store computer-readable instructions; and one or more processors configured to execute the computer readable instructions stored in the memory to perform one or more LIDAR completion tasks using received sensor data to predict dense depth image data in accordance with a trained generator model, wherein the trained generator model is trained by: generating, via a generator network, a dense predicted Light Detection and Ranging (LIDAR) depth image based upon receiving, as training data, inputs that include (i) a camera image that was generated via one or more cameras, and (ii) a corresponding sparse LIDAR depth image that was generated via one or more LIDAR sensors; generating, via an adversary network, a per-pixel label existence probability image based upon receiving the dense predicted LIDAR depth image as an input, the per-pixel label existence probability image representing, for each pixel in the dense predicted LIDAR depth image, a probability with respect to whether a predetermined label was identified from a supervision stage of the generator network; and iteratively training in parallel (i) the generator model via the generator network based upon the dense predicted LIDAR depth image, and (ii) an adversary model via the adversary network based upon the per-pixel label existence probability image.

A method as shown and described.

An apparatus as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A method, comprising:
generating, via a generator network, a dense predicted Light Detection and Ranging (LIDAR) depth image based upon receiving, as training data, inputs that include (i) a camera image that was generated via one or more cameras, and (ii) a corresponding sparse LIDAR depth image that was generated via one or more LIDAR sensors;
generating, via an adversary network, a per-pixel label existence probability image based upon receiving the dense predicted LIDAR depth image as an input, the per-pixel label existence probability image representing, for each pixel in the dense predicted LIDAR depth image, a probability with respect to whether a predetermined label was identified from a supervision stage of the generator network;
iteratively training in parallel (i) a generator model via the generator network based upon the dense predicted LIDAR depth image, and (ii) an adversary model via the adversary network based upon the per-pixel label existence probability image; and
deploying the generator model to a vehicle to perform LIDAR depth prediction using data generated via one or more sensors implemented in the vehicle.

2. The method of claim 1, wherein the act of iteratively training in parallel the generator model and the adversary model comprises:
iteratively modifying the generator model using a generator model loss and an adversary model loss as part of a back-propagation stage until (i) the generator model loss is less than a predetermined threshold generator model loss value, and (ii) the adversary model loss is greater than a predetermined threshold adversary model loss value.

3. The method of claim 1, wherein the sparse LIDAR depth image comprises (i) a set of depth data pixels that are identified with depth data labels, and (ii) a set of ignored pixels that are identified with ignore labels for which depth data is not available, and further comprising:
generating a sparse LIDAR existence map that assigns (i) a first binary value to the set of depth data pixels, and (ii) a second binary value to the set of ignored pixels.

4. The method of claim 3, wherein the act of iteratively training the adversary model comprises:
iteratively modifying the adversary model using an adversary model loss as part of a back-propagation stage, the adversary model loss being generated based upon a comparison between the per-pixel label existence probability image and the sparse LIDAR existence map.

5. The method of claim 4, wherein the adversary model loss is generated based upon a binary-cross-entropy (BCE) per-pixel comparison between the per-pixel label existence probability image and the sparse LIDAR existence map.

6. The method of claim 2, wherein the generator model loss is based upon a difference between (i) the dense predicted LIDAR depth image, and (ii) the corresponding sparse LIDAR depth image from the training data.

7. The method of claim 2, wherein the act of iteratively training in parallel the generator model and the adversary model comprises:
iteratively modifying the generator model until (i) the generator model loss is minimized, and (ii) the adversary model loss is maximized.

8. A computing device, comprising:
a memory configured to store computer-readable instructions; and
one or more processors configured to execute the computer readable instructions stored in the memory to:

generate, via a generator network, a dense predicted Light Detection and Ranging (LIDAR) depth image based upon receiving, as training data, inputs that include (i) a camera image that was generated via one or more cameras, and (ii) a corresponding sparse LIDAR depth image that was generated via one or more LIDAR sensors;

generate, via an adversary network, a per-pixel label existence probability image based upon receiving the dense predicted LIDAR depth image as an input, the per-pixel label existence probability image representing, for each pixel in the dense predicted LIDAR depth image, a probability with respect to whether a predetermined label was identified from a supervision stage of the generator network; and iteratively train in parallel (i) a generator model via the generator network based upon the dense predicted LIDAR depth image, and (ii) an adversary model via the adversary network based upon the per-pixel label existence probability image, wherein the generator model is deployed in a vehicle to perform LIDAR depth prediction using data generated via one or more sensors implemented in the vehicle.

9. The computing device of claim 8, wherein the computing device is configured to iteratively train in parallel the generator model and the adversary model by:

iteratively modifying the generator model using a generator model loss and an adversary model loss as part of a back-propagation stage until (i) the generator model loss is less than a predetermined threshold generator model loss value, and (ii) the adversary model loss is greater than a predetermined threshold adversary model loss value.

10. The computing device of claim 8, wherein the sparse LIDAR depth image comprises (i) a set of depth data pixels that are identified with depth data labels, and (ii) a set of ignored pixels that are identified with ignore labels for which depth data is not available, and wherein the computing device is configured to generate a sparse LIDAR existence map that assigns (i) a first binary value to the set of depth data pixels, and (ii) a second binary value to the set of ignored pixels.

11. The computing device of claim 10, wherein the computing device is configured to iteratively train the adversary model by:

iteratively modifying the adversary model using an adversary model loss as part of a back-propagation stage, the adversary model loss being generated based upon a comparison between the per-pixel label existence probability image and the sparse LIDAR existence map.

12. The computing device of claim 11, wherein the adversary model loss is generated based upon a binary-cross-entropy (BCE) per-pixel comparison between the per-pixel label existence probability image and the sparse LIDAR existence map.

13. The computing device of claim 9, wherein the generator model loss is based upon a difference between (i) the dense predicted LIDAR depth image, and (ii) the corresponding sparse LIDAR depth image from the training data.

14. The computing device of claim 9, wherein the computing device is configured to iteratively train in parallel the generator model and the adversary model by:

iteratively modifying the generator model until (i) the generator model loss is minimized, and (ii) the adversary model loss is maximized.

15. A non-transitory computer-readable medium having instructions stored thereon that, when executed by processing circuitry of a computing device, cause the computing device to:

generate, via a generator network, a dense predicted Light Detection and Ranging (LIDAR) depth image based upon receiving, as training data, inputs that include (i) a camera image that was generated via one or more cameras, and (ii) a corresponding sparse LIDAR depth image that was generated via one or more LIDAR sensors;

generate, via an adversary network, a per-pixel label existence probability image based upon receiving the dense predicted LIDAR depth image as an input, the per-pixel label existence probability image representing, for each pixel in the dense predicted LIDAR depth image, a probability with respect to whether a predetermined label was identified from a supervision stage of the generator network; and iteratively train in parallel (i) a generator model via the generator network based upon the dense predicted LIDAR depth image, and (ii) an adversary model via the adversary network based upon the per-pixel label existence probability image, wherein the generator model is deployed in a vehicle to perform LIDAR depth prediction using data generated via one or more sensors implemented in the vehicle.

16. The non-transitory computer-readable medium of claim 15, wherein the computer-readable instructions, when executed by the processing circuitry, further cause the computing device to iteratively train in parallel the generator model and the adversary model by:

iteratively modifying the generator model using a generator model loss and an adversary model loss as part of a back-propagation stage until (i) the generator model loss is less than a predetermined threshold generator model loss value, and (ii) the adversary model loss is greater than a predetermined threshold adversary model loss value.

17. The non-transitory computer-readable medium of claim 15, wherein the sparse LIDAR depth image comprises (i) a set of depth data pixels that are identified with depth data labels, and (ii) a set of ignored pixels that are identified with ignore labels for which depth data is not available, and wherein the computer-readable instructions, when executed by the processing circuitry, further cause the computing device to generate a sparse LIDAR existence map that assigns (i) a first binary value to the set of depth data pixels, and (ii) a second binary value to the set of ignored pixels.

18. The non-transitory computer-readable medium of claim 17, wherein the computer-readable instructions, when executed by the processing circuitry, further cause the computing device to iteratively train the adversary model by:

iteratively modifying the adversary model using an adversary model loss as part of a back-propagation stage, the adversary model loss being generated based upon a comparison between the per-pixel label existence probability image and the sparse LIDAR existence map.

19. The non-transitory computer-readable medium of claim 18, wherein the adversary model loss is generated based upon a binary-cross-entropy (BCE) per-pixel comparison between the per-pixel label existence probability image and the sparse LIDAR existence map.

20. The non-transitory computer-readable medium of claim 16, wherein the generator model loss is based upon a difference between (i) the dense predicted LIDAR depth image, and (ii) the corresponding sparse LIDAR depth image from the training data.

21. The non-transitory computer-readable medium of claim 16, wherein the computer-readable instructions, when executed by the processing circuitry, further cause the computing device to iteratively train in parallel the generator model and the adversary model by:

iteratively modifying the generator model until (i) the generator model loss is minimized, and (ii) the adversary model loss is maximized.

22. A system, comprising:

a memory configured to store computer-readable instructions; and one or more processors configured to execute the computer readable instructions stored in the memory to perform one or more Light Detection and Ranging (LIDAR) completion tasks by applying a trained generator model to received sensor data to predict dense depth image data, wherein the trained generator model is trained by:

generating, via a generator network, a dense predicted LIDAR depth image based upon receiving, as training data, inputs that a sparse LIDAR depth image;

generating, via an adversary network, a per-pixel label existence probability image based upon receiving the dense predicted LIDAR depth image as an input, the per-pixel label existence probability image representing, for each pixel in the dense predicted LIDAR depth image, a probability with respect to whether a predetermined label was identified from a supervision stage of the generator network; and iteratively training in parallel (i) the generator model via the generator network based upon the dense predicted LIDAR depth image, and (ii) an adversary model via the adversary network based upon the per-pixel label existence probability image.

23. The system of claim 22, wherein the act of iteratively training in parallel the generator model and the adversary model comprises:

iteratively modifying the generator model using a generator model loss and an adversary model loss as part of a back-propagation stage until (i) the generator model loss is less than a predetermined threshold generator model loss value, and (ii) the adversary model loss is greater than a predetermined threshold adversary model loss value.

24. The system of claim 22, wherein the sparse LIDAR depth image comprises (i) a set of depth data pixels that are identified with depth data labels, and (ii) a set of ignored pixels that are identified with ignore labels for which depth data is not available, and wherein the act of iteratively training in parallel the generator model and the adversary model comprises:

generating a sparse LIDAR existence map that assigns (i) a first binary value to the set of depth data pixels, and (ii) a second binary value to the set of ignored pixels; and iteratively modifying the adversary model using an adversary model loss as part of a back-propagation stage, the adversary model loss being generated based upon a comparison between the per-pixel label existence probability image and the sparse LIDAR existence map.

25. The system of claim 22, wherein the one or more processors are configured to execute the computer readable instructions stored in the memory to perform a navigation-related operation based on the dense predicted LIDAR depth image.

26. The system of claim 25, wherein the one or more processors are configured to execute the computer readable instructions stored in the memory to perform the navigation-related operation by:

generating an environmental model based at least in part on the dense predicted LIDAR depth image; and applying a driving policy model with the environmental model to determine the navigation-related operation to be performed by a vehicle.

* * * * *